(12) United States Patent
Kumazaki et al.

(10) Patent No.: US 8,192,326 B2
(45) Date of Patent: Jun. 5, 2012

(54) CONTROL DEVICE FOR VEHICULAR POWER TRANSMITTING APPARATUS

(75) Inventors: Kenta Kumazaki, Toyota (JP); Tooru Matsubara, Toyota (JP); Atsushi Tabata, Okazaki (JP); Masakazu Kaifuku, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 869 days.

(21) Appl. No.: 12/232,881

(22) Filed: Sep. 25, 2008

(65) Prior Publication Data

US 2009/0088291 A1    Apr. 2, 2009

(30) Foreign Application Priority Data

Sep. 28, 2007  (JP) ................................ 2007-255575

(51) Int. Cl.
 *B60W 10/04*  (2006.01)
 *F16H 15/38*  (2006.01)
 *F16H 61/664*  (2006.01)
 *F16H 31/00*  (2006.01)
 *B60K 6/445*  (2007.10)

(52) U.S. Cl. .............. 477/35; 477/37; 477/50; 475/118; 475/120; 475/127; 180/65.235

(58) Field of Classification Search .......... 475/116–118, 475/120, 122, 127; 477/35, 37, 39, 40, 50, 477/70–72, 76; 180/65.235
See application file for complete search history.

(56) References Cited

U.S. PATENT DOCUMENTS

| 5,588,927 | A  | * | 12/1996 | Tsukamoto et al. | .......... | 475/128 |
| 6,978,854 | B1 | * | 12/2005 | Kuang et al. | ............. | 180/65.235 |
| 2002/0179351 | A1 | | 12/2002 | Shimabukuro et al. | | |
| 2007/0155581 | A1 | * | 7/2007 | Tabata et al. | ....................... | 477/3 |
| 2007/0155584 | A1 | * | 7/2007 | Tabata et al. | .................... | 477/70 |

FOREIGN PATENT DOCUMENTS

| JP | A-2003-48460 | 2/2003 |
| JP | A-2006-046487 | 2/2006 |

OTHER PUBLICATIONS

Office Action issued in Japanese Patent Application No. 2007-255575 mailed Jan. 10, 2012. (with English language translation).

* cited by examiner

*Primary Examiner* — Tisha Lewis

(74) *Attorney, Agent, or Firm* — Oliff & Berridge, PLC

(57) ABSTRACT

Rotation-stop determining portion queries as to whether the first rotary element is lowered in a rotation speed to be stopped during an engine drive mode. If the answer is YES and differential-portion rotation speed determining portion makes a positive determination, then engaging-element control-executing portion executes engaging element control. This allows a third rotary element of the differential portion, connected to drive wheels via an engaging element of an automatic shifting portion, to approach a state available to freewheel. This prevents a second rotary element and a first electric motor from reaching high-speed rotations caused by a decrease in rotation speed of the first rotary element in a stop direction and a differential action of the differential portion. This enables the prevention of a durability decrease of a power distributing mechanism and the first electric motor.

11 Claims, 10 Drawing Sheets

| | C0 | C1 | C2 | B0 | B1 | B2 | B3 | SHIFTING RATIO | STEP |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | ○ | | 3.209 | |
| N | | | | | | | | | |

○ ENGAGED
◎ ENGAGED UPON STEP-VARIABLE
  RELEASED UPON CONTINUOUSLY-VARIABLE

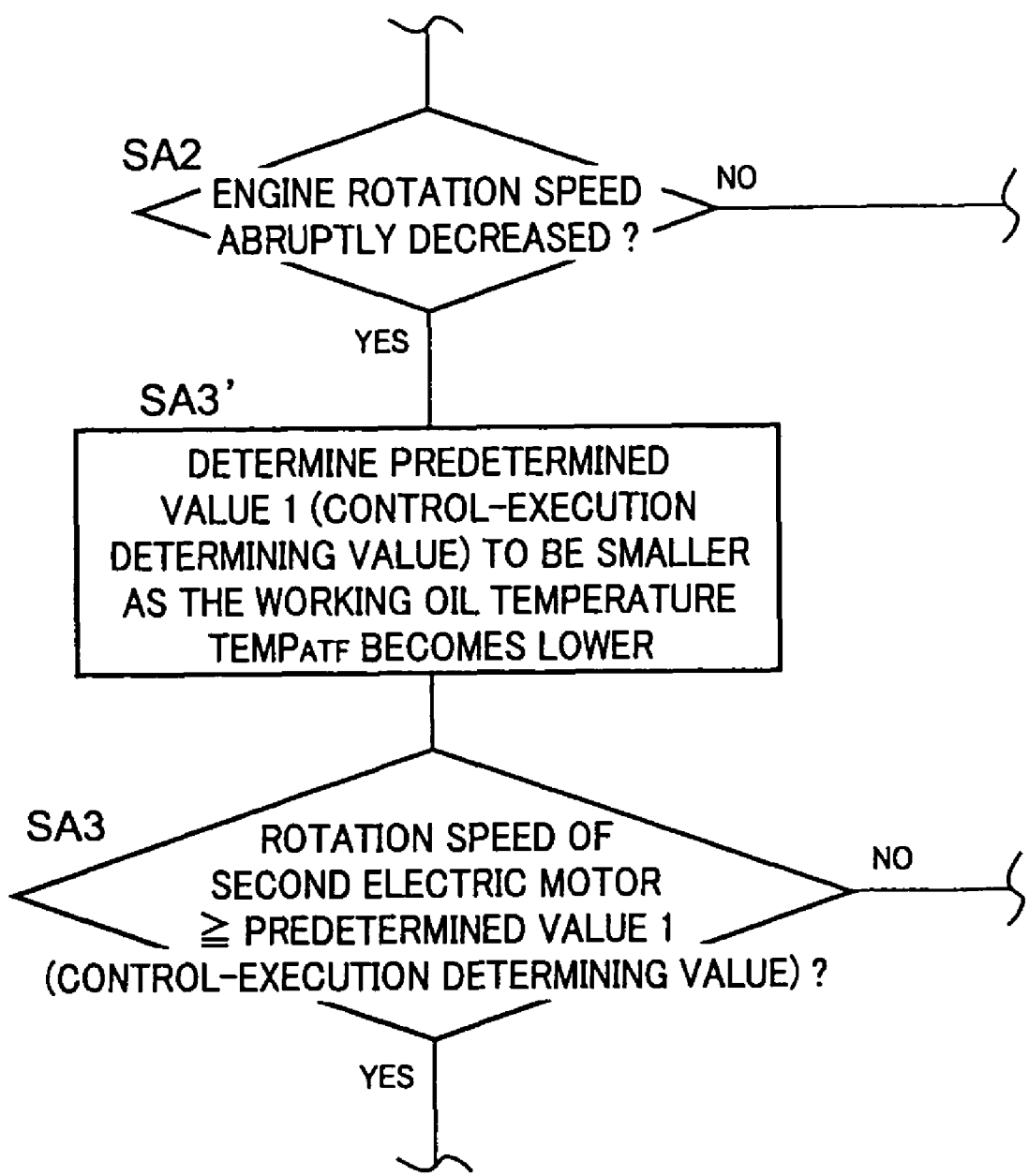

CONTROL DEVICE FOR VEHICULAR POWER TRANSMITTING APPARATUS

TECHNICAL FIELD

The present invention relates to a control devices for vehicular power transmitting apparatus. In particular, in the vehicular power transmitting apparatus, a differential portion is connected to a prime mover and operative to perform a differential action. The control device prevents a rotary element of the differential portion from reaching a high-speed rotation to thereby suppress a durability decrease of the differential portion and related component thereto.

BACKGROUND ART

In the related art, there has heretofore been known a hybrid vehicular power transmitting apparatus including a first shifting portion and a second shifting portion. The first shifting portion acts as a differential portion connected to a prime mover, such as an internal combustion engine or the like, to be operative to perform a differential action. The second shifting portion acts as an automatic shifting portion forming part of a power transmitting path extending from the first shifting portion to drive wheels. For instance, Patent Gazette 1 (Japanese Patent Application Publication No. 2006-46487) discloses such a hybrid vehicular power transmitting apparatus. With a control device for such a hybrid vehicle power transmitting apparatus, a normal-operation disabling state may be caused in some cases, i.e., a failure occurs in either one of the first and second shifting portions. Then, a speed ratio of the other shifting portion, available to perform a normal operation, is altered so as to suppress the occurrence of fluctuation in speed ratio of an entire power transmitting apparatus mentioned above. In such a case, alternatively, the other shifting portion, available to perform the normal operation, is placed in a neutral state causing the power transmitting path to be disconnected.

With the control device for the hybrid vehicular power transmitting apparatus disclosed in Patent Gazette 1, executing such a control operation is deemed to provide an effect of minimizing an adverse affect on the vehicle running caused by the occurrence of the failure in the first and second shifting portions. However, if such a failure or the like occurs, then the prime mover may be caused to suddenly stop during the running of the vehicle propelled by the prime mover as the drive-force source. If the prime mover suddenly stops in such a way, a rotary element of the first shifting portion is caused to reach a high-speed rotation due to the occurrences of the sudden stop of the prime mover and the differential action of the first shifting portion acting as the differential portion. Thus, it is considered a drop i.e. decrease may occur in durability of the first shifting portion and related component parts or the like. In addition, no solution is disclosed in Patent Gazette 1 for addressing such an issue arising when the prime mover is caused to suddenly stop.

SUMMARY OF THE INVENTION

The present invention has been completed with such a view in mind and has an object to provide a control device for a vehicular power transmitting apparatus having a differential portion connected to a prime mover for performing a differential action for minimizing a durability decrease of the differential portion and related component parts or the like. The durability decrease minimizing can be achieved by preventing the rotary element of the differential portion from reaching the high-speed rotation.

For achieving the above object, a first aspect of the invention relates to a control device for a vehicular power transmitting apparatus. The vehicular power transmitting apparatus comprises a differential portion having a plurality of rotary elements, and engaging elements provided in a part of a power transmitting path extending from an output shaft of the differential portion to drive wheels.

The control device is operative to execute an engaging element control for placing the engaging element in a disengaging state or a slip state, when a first rotary element of the differential portion is caused to stop or decrease in a rotation speed in a direction to stop the first rotary element during running of a vehicle.

In the second aspect of the invention, the control device executes the engaging element control when a rotation speed of an output shaft of the differential portion exceeds a control-execution determining value.

In the third aspect of the invention, a prime mover is connected to a first rotary element of the differential portion of the power transmitting apparatus, and the control device executes the engaging element control when a variation rate of a rotation speed of the prime mover per unit time abruptly decreases exceeding a given rotation-speed variation-rate determining value.

In a fourth aspect of the invention, the differential portion of the power transmitting apparatus includes a second rotary element to which a first electric motor is connected in a power transmissive state to enable a differential state of the differential portion to be controlled; and the control device executes the engaging element control when difficulty or impossibility to control the differential state of the differential portion by only the first electric motor is determined.

In a fifth aspect of the invention, the differential portion of the power transmitting apparatus includes an electrically controlled differential portion operative to control a differential state of the differential portion upon controlling an operating state of a first electric motor connected to a second rotary element of the differential portion in a power transmissive state; and the power transmitting apparatus further comprises a second electric motor connected to the power transmitting path and the first rotary element is connected to a prime mover in the power transmissive state.

In a sixth aspect of the invention, the control-execution determining value is altered depending on a temperature of lubricating fluid in the power transmitting apparatus.

In a seventh aspect of the invention, the power transmitting apparatus includes a shift portion provided in the power transmitting path and the engaging element includes component elements of the shifting portion.

According to the first aspect of the present invention, if the first rotary element of the differential portion is caused to decrease in rotation speed in a direction to be stopped, the engaging element control is executed to allow the engaging element to be placed in the disengaging or slipping state. This enables the rotary element of the differential portion, connected to the drive wheels via the engaging element, to move closer to a freewheeling or free-rotating state. This prevents the rotary element of the differential portion, except for the first rotary element, from increasing to the high-speed rotation due to the occurrence of the first rotary element being stopped or decreased in rotation speed in the direction to be stopped. This enables a durability reduction of the differential portion and the related component parts such as an electric motor connected thereto.

According to the second aspect of the present invention, the engaging element control is executed when the rotation speed of the output shaft of the differential portion exceeds the control-execution determining value. This allows the engaging element control to be executed especially when the rotary element of the differential portion, except for the first rotary element, may highly increase to the high-speed rotation due to the first rotary element being stopped or deceased in rotation speed in the direction to be halted, thereby enabling a reduction in control load. This enables a durability reduction of the differential portion and the related component parts such as an electric motor connected thereto.

As used herein, the term "control-execution determining value" refers to the determining value that is predetermined on the rotation speed of the output shaft for determining whether to execute the engaging-element.

According to the third aspect of the present invention, the prime mover is connected to the first rotary element of the differential portion and the engaging element control is executed when a rapid decrease occurs the in rotation speed of the prime mover with the rotation speed of the prime mover varying at the rate exceeding the rotation-speed variation-rate determining value. Therefore, the engaging element control is executed when the rotary element of the differential portion, except for the first rotary element, may highly increase to the high-speed rotation due to the occurrence of the rapid decrease in the rotation speed of the prime mover and the differential action of the differential mechanism. Thus, the reduction in control load is achieved. This enables the durability reduction of the differential portion and the related component parts such as an electric motor connected thereto.

As used herein, the term "rotation-speed variation-rate determining value" refers to a preset determining value based on which a query is made as to whether the rapid decrease occurs in the rotation speed of the prime mover at the rate needed to execute the engaging element control. A direction in which the decrease occurs in such a rotation speed represents a positive direction in a variation rate of the rotation speed of the prime mover, and the rotation-speed variation-rate determining value lies at a positive value.

According to the fourth aspect of the present invention, the first electric motor is connected to the second rotary element of the differential portion in a power transmissive state for enabling the differential action of the differential portion to be controlled. The engaging element control is executed when difficulty or impossibility to control the differential action of the differential portion with the use of only the first electric motor is determined. Therefore, if the differential action of the differential portion is controlled to prevent the rotary element of the differential portion from reaching the high-speed rotation, even if no engaging element control is executed, then no engaging element control is executed to achieve the reduction in control load. This enables the suppression of a durability decrease of the differential portion and component parts such as the first electric motor connected to such a differential portion.

According to the fifth aspect of the present invention, (a) the differential portion comprises the electrically controlled differential portion in which controlling the operating state of the first electric motor, connected to the second rotary element of the differential portion in a power transmissive state, allows the differential state of the differential portion to be controlled; (b) the power transmitting apparatus includes the second electric motor connected to the power transmitting path; and (c) the first rotary element is connected to the prime mover in a power transmissive state. With the differential state of the differential portion controlled in such a way, the prime mover can be driven so as to achieve the rotation speed to the realize optimum fuel consumption with no restraint from the vehicle speed. Further, the second electric motor can assist the output of the prime mover, while allowing only the second electric motor to function as a drive-force source to drive a vehicle.

The lower the temperature of lubricating oil in the power transmitting apparatus, the lower will be the temperature of the engaging element incorporated in such a power transmitting apparatus. This results in a tendency with a decrease in response for the control signal being applied to the engaging device. Further, with the engaging device composed of a wet type structure, if the engaging element has an extremely low temperature, working fluid prevailing in the engaging device has increased viscosity with the occurrence of difficulty caused in controlling the engaging element under an appropriate slipping-state.

In contrast, with the sixth aspect of the present invention, the control-execution determining value is altered depending on the temperature of lubricating fluid in the power transmitting apparatus. Thus, a condition for the engaging element control to be executed is altered depending on difficulty for the engaging element to be controlled. This appropriately enables the suppression of a drop in duration of the differential device and the related component parts such as, for instance, an electric motor connected to the differential portion.

According to a seventh aspect of the present invention, the power transmitting apparatus includes the shifting portion provided in the power transmitting path and the engaging element acts as a component element of such a shifting portion. This enables the output from the prime mover to be shifted with the shifted output being transferred to the drive wheels. Thus, controlling the shifting portion allows the same advantageous effects as those of the first aspect of the present invention to be obtained.

Preferably, (a) the engaging element is actuated in response to hydraulic pressure and (b) the engaging element control is effectuated upon executing the line-pressure reduction control, operative to decrease the line pressure acting as an original pressure of working oil supplied to the engaging element, and/or the engaged-element disengaging control for operating the engaging element to a disengaging i.e. releasing side. With such controls, the engaging element control can be easily performed upon executing the hydraulic pressure control.

Preferably, further, (a) the power transmitting apparatus includes the line pressure regulator valve operative to regulate the line pressure and (b) the line-pressure reduction control represents a control for causing the line pressure regulator valve to decrease the line pressure. With such an arrangement, slightly controlling hydraulic pressure equipment, i.e. controlling the line pressure regulator valve in the presence of plural engaging elements allows all of the engaging elements, supplied with the line pressure, to be operated in disengagements.

Preferably, furthermore, (a) the power transmitting apparatus includes a line pressure generating device for generating the line pressure and (b) the line pressure control is to stop the line pressure generating device or to control the same in a direction to stop the same.

Preferably, moreover, (a) the power transmitting apparatus includes a hydraulic pressure switching valve operative to be switched in conjunction with the shift lever in accordance with an electrical command signal based on the operation of the shift lever and (b) the line-pressure reduction control is to perform a control so as to prevent the hydraulic pressure switching valve from operating with the shift lever in an interlocking relationship and to interrupt the line pressure being delivered to the engaging element or to perform a control in a direction for interruption. With such an arrangement, with plural engaging elements being provided, merely controlling the hydraulic pressure switching valve allows the all of the engaging elements, to which the line pressure is supplied, to be operated in engagements.

Preferably, further, (a) the power transmitting apparatus includes a hydraulic pressure control valve operative to reduce the line pressure for supply to the engaging element and (b) the engaged-element disengaging control is effectuated upon causing the hydraulic pressure control valve to decrease the hydraulic pressure being delivered to the engaging element. With such a control, no line pressure is caused to decrease during the engaging element control and the line pressure is already established when the engaging element control is completed, thereby making it easy to perform a control for recovery from the engaging element control.

BRIEF DESCRIPTION OF THE DRAWINGS

FIG. 13 represents one example of a flow chart a step, additionally executed in the flow chart of FIG. 9, wherein a control-execution determining value is determined such that the lower the working oil in the automatic shifting portion, the smaller will be the control-execution determining value.

BEST MODE FOR CARRYING OUT THE INVENTION

Now, an embodiment of the present invention will be described below with reference to accompanying drawings.
<Embodiment>

Figures 1, 2:
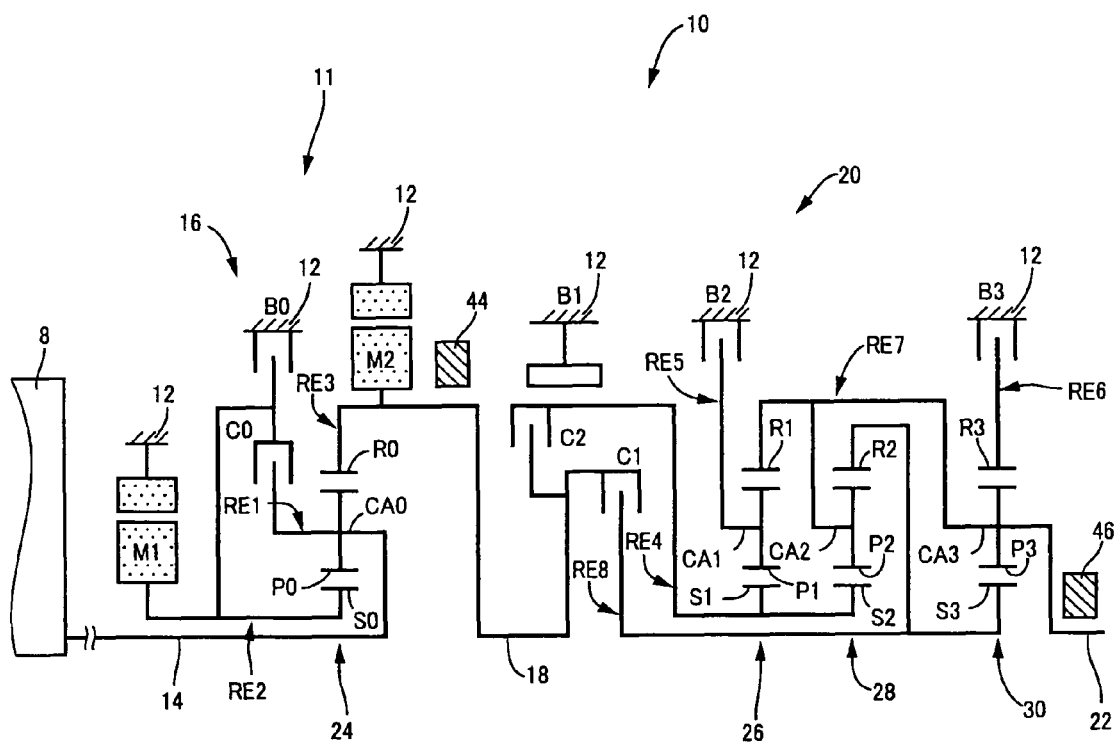
FIG. 1 is a skeleton view explaining a structure of a power transmitting apparatus for a hybrid vehicle to which a control device of the present invention is applied.
FIG. 2 is an engagement operation table illustrating the relationship between a shifting operation, in which the power transmitting apparatus for the hybrid vehicle, shown in FIG. 1, is placed in a continuously variable or step-variable shifting state, and the operation of a hydraulic-type frictional engaging device in combination.

FIG. 1 is a skeleton view illustrating a shifting mechanism 10, a power transmitting apparatus for a hybrid vehicle, to which a control device of one embodiment according to the present invention is applied. As shown in FIG. 1, the shifting mechanism 10 includes an input shaft 14 serving as an input rotary member, a differential portion 11 directly connected to the input shaft 14 or indirectly connected thereto through a pulsation absorbing damper (vibration damping device) not shown, an automatic shifting portion 20 directly connected to the differential portion 11 via a power transmitting member 18 (corresponding to an output shaft of the differential portion 11) in series through a power transmitting path between the differential mechanism 11 and drive wheels 38 (see FIG. 6), and an output shaft 22 connected to the automatic shifting portion 20, all of which are disposed in a transmission casing 12 (hereinafter briefly referred to as "casing 12") serving as a non-rotary member connectedly mounted on a vehicle body.

Figure 6:
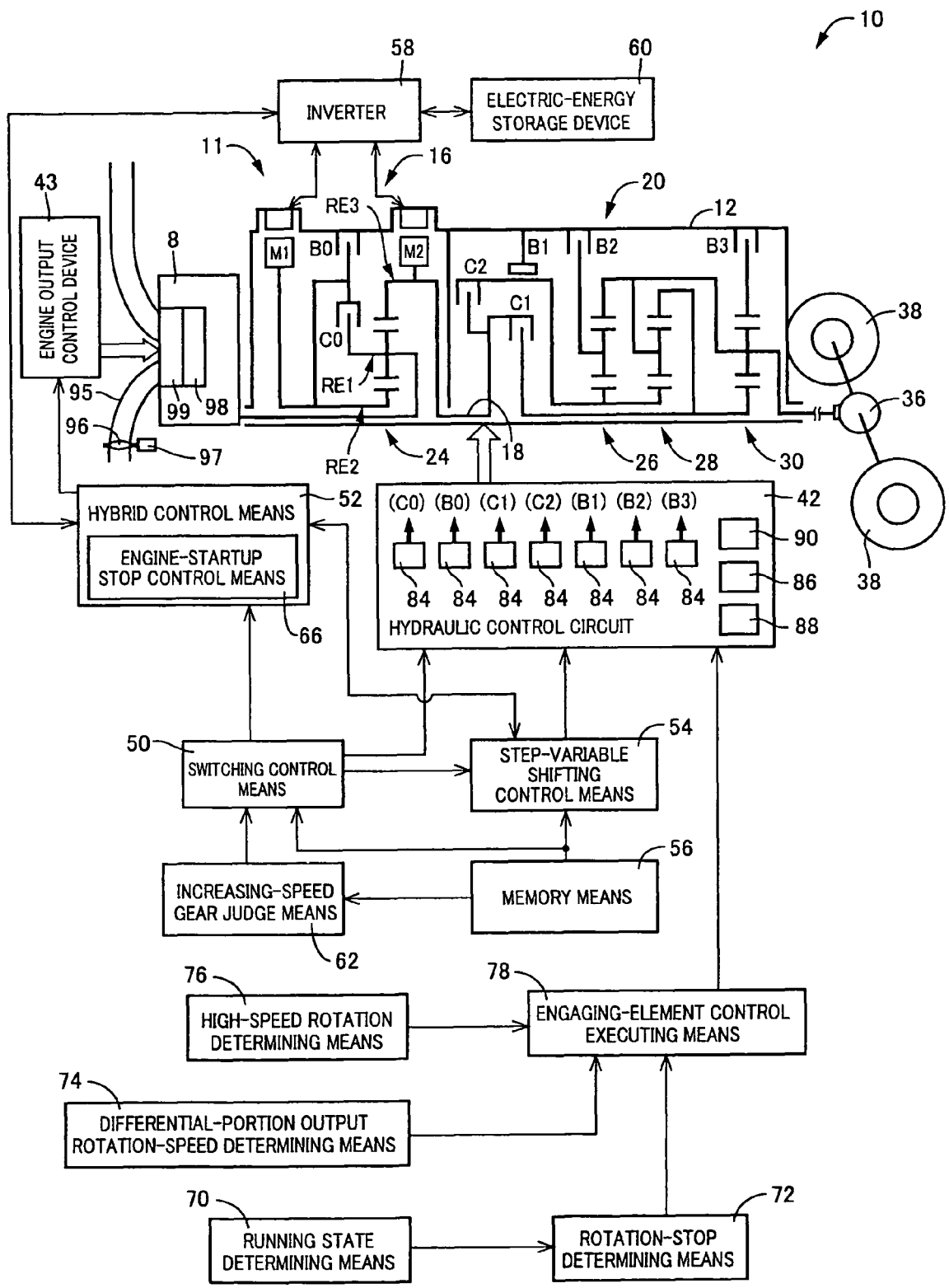
FIG. 6 is a functional block diagram illustrating a major control function to be executed by the electronic control device shown in FIG. 4.

The shifting mechanism 10, preferably applicable to a vehicle of FR type (front-engine rear-drive type), is disposed between a longitudinally mounted engine 8, i.e., an internal combustion engine such as a gasoline engine or a diesel engine serving as a drive force directly connected to the input shaft 14 or indirectly connected thereto via the pulsation absorbing damper, and a pair of drive wheels 38 (FIG. 6). This allows a vehicle drive force to be transmitted to the pair of drive wheels 38 on left and right in sequence through a differential gear device 36 (final speed reduction gear) and a pair of drive axles.

With the shifting mechanism 10 of the present embodiment, the engine 8 and the differential portion 11 are connected to each other in a direct connection. As used herein, the term "direct connection" may refer to a connection, established without intervening any fluid-type transmitting device such as a torque converter or a fluid coupling, which involves a connection established with the use of the vibration damping device. Upper and lower halves of the shifting mechanism 10 are structured in symmetric relation with respect to an axis of the shifting mechanism 10 and, hence, the lower half is omitted in the skeleton view of FIG. 1.

The differential portion 11 includes a first electric motor M1 (first electric motor) which controls the differential state of this differential portion 11, a power distributing mechanism 16 serving as a mechanical mechanism like a differential mechanism through which an output of the engine 8, inputted to the input shaft 14, is transferred to the first electric motor M1 and the power transmitting member 18, and a second electric motor M2 (second electric motor) connected to the power transmitting path between the power transmitting member 18 which is an output shaft of the differential portion 11 and the drive wheels 38, and is specifically disposed to be unitarily rotatable with the power transmitting member 18.

Further, the first and second electric motors M1 and M2 are so-called motor/generators each having a function even as an electric power generator. The first electric motor M1 has at least one function as an electric power generator that generates a reactive force, and the second electric motor M2 has at least a function as an electric motor serving as a drive force source to generate a drive force to run the vehicle.

The power distributing mechanism 16, corresponding to the differential mechanism, mainly includes a differential-portion planetary gear unit 24 of a single pinion type having a given gear ratio ρ0 of, for instance, about "0.418", a switching clutch C0 and a switching brake B0. The differential-portion planetary gear unit 24 includes rotary elements, such as a differential-portion sun gear S0, a differential-portion planetary gears P0, a differential-portion carrier CA0 supporting the differential-portion planetary gears P0 to be rotatable about its axis and about the axis of the differential-portion sun gear S0, and a differential-portion ring gear R0 meshing with the differential-portion sun gear S0 through the differential-portion planetary gears P0. With the differential-portion sun gear S0 and the differential-portion ring gear R0 assigned to have the numbers of teeth represented by ZS0 and ZR0, respectively, the gear ratio ρ0 is expressed as ZS0/ZR0.

With the power distributing mechanism 16 of such a structure, the differential-portion carrier CA0 is connected to the input shaft 14, i.e., to the engine 8; the differential-portion sun gear S0 is connected to the first electric motor M1; and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. With both the switching clutch C0 and the switching brake B0 being disengaged, the power distributing mechanism 16 is rendered operative such that the differential-portion sun gear S0, the differential-portion carrier CA0 and the differential-portion ring gear R0, forming the three elements of the differential-portion planetary gear unit 24, are caused to rotate relative to each other to enable the operation in a differential action, i.e., in a differential state under which the differential action is effectuated.

Thus, the output of the engine 8 is distributed to the first electric motor M1 and the power transmitting member 18 with a part of the engine output distributed to the first electric motor M1 being used to generate electric energy to be stored in a battery or to drivably rotate the second electric motor M2. This renders the differential portion 11 (power distributing mechanism 16) operative as an electrically controlled differential device. Thus, the differential portion 11 is placed in a so-called continuously variable shifting state (electrically controlled CVT state), in which a rotation speed of the power transmitting member 18 varies in a continuous fashion regardless of the engine 8 operating at a given rotation speed.

That is, as the power distributing mechanism 16 is placed in the differential state, the differential portion 11 is also placed in differential state. In this casing, the differential portion 11 is placed in the continuously variable shifting state to operate as the electrically controlled continuously variable transmission with a speed ratio γ0 (a ratio of rotation speed of the driving device input shaft 14 to the rotation speed of the power transmitting member 18) continuously varying in a value ranging from a minimum value $γ0_{min}$ to a maximum value $γ0_{max}$. When the power distributing mechanism 16 is placed in the differential state, by controlling drive states of the first electric motor M1, the second electric motor M2 and the engine 8 which are connected to the power distributing mechanism 16 (differential portion 11) in the power transmissive state, the differential state of the power distributing mechanism 16, i.e., the differential sate of the rotation speeds between the input shaft 14 and power transmitting member 18 are controlled, so that the differential portion 11 functions as the electric differential portion.

Under such a state, as the switching clutch C0 or the switching brake B0 is engaged, the power distributing mechanism 16 is disenabled to perform the differential action, i.e., placed in a non-differential state in which no differential action is effectuated. In particular, as the switching clutch C0 is engaged to cause the differential-portion sun gear S0 and the differential-portion carrier CA0 to be unitarily coupled to each other, the power distributing mechanism 16 is placed in a locked state under which the differential-portion sun gear S0, the differential-portion carrier CA0 and the differential-portion ring gear R0, serving as the three elements of the differential-portion planetary gear unit 24, are caused to rotate together, i.e., in a unitarily rotating state under the non-differential state in which no differential action is effectuated. Thus, the differential portion 11 is placed in the non-differential state. Therefore, the rotation speeds of the engine 8 and the power transmitting member 18 coincide with each other, so that the differential portion 11 (power distributing mechanism 16) is placed in a fixed shifting state, i.e., a step-variable shifting state to function as a transmission with the speed ratio γ0 connected to a value of "1".

Instead of the switching clutch C0, next, if the switching brake B0 is engaged to connect the differential-portion sun gear S0 to the casing 12, then, the power distributing mechanism 16 is placed in the locked state. Thus, the differential-portion sun gear S0 is placed in the non-rotating state under the non-differential state in which no differential action is initiated, causing the differential portion 11 to be placed in the non-differential state.

Since the differential-portion ring gear R0 rotates at a speed higher than that of the differential-portion carrier CA0, the power distributing mechanism 16 functions as a speed-increasing mechanism. Thus, the differential portion 11 (power distributing mechanism 16) is placed in the fixed shifting state, i.e., the step-variable shifting state to perform a function as a speed-increasing transmission with the speed ratio γ0 connected to a value smaller than "1", i.e., for example, about 0.7.

With the present embodiment, the switching clutch C0 and the switching brake B0 selectively place the shifting state of differential portion 11 (power distributing mechanism 16) in the differential state, i.e., the unlocked state and the non-differential state, i.e., the locked state. That is, the switching clutch C0 and the switching brake B0 serves as a differential state switching device that selectively switches the differential portion 11 (power distributing mechanism 16) in one of: the continuously variable shifting state, operative to perform the electrically and continuously controlled variable shifting operation, under which the differential portion 11 (power distributing mechanism 16) is placed in the differential state (coupled state) to perform the function as the electrically controlled differential device operative to function as the continuously variable transmission with, for instance, the shifting ratio is continuously variable; and the fixed shifting state under which the differential portion 11 (power distributing mechanism 16) is placed in the shifting state, disenabling the function of the electrically controlled continuously variable shifting operation, such as the locked state disenabling the function of the continuously variable transmission in which no continuously variable shifting operation is effectuated with a speed ratio being locked at a connected level.

In the locked state, the differential portion 11 (power distributing mechanism 16) is rendered operative as a transmission of a single-stage or a multi-stage with a speed ratio of one kind or speed ratios of more than two kinds to function in the fixed shifting state (non-differential state), disenabling the electrically controlled continuously variable shifting operation, under which the differential portion 11 (power distributing mechanism 16) operates as the transmission of the single-stage or the multi-stage with the speed ratio kept at a connected level.

The automatic shifting portion 20, corresponding to a shifting portion of the present invention, is the shifting portion functioning as the step-variable type automatic transmission to vary step-by-step its speed ratio (=rotation speed $N_{18}$ of the power transmitting member 18/rotation speed $N_{OUT}$ of the output rotary member 22). It includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 to be rotatable about its axis and about the axis of the first sun gear S1, and a first differential-portion ring gear R1 meshing with the first sun gear S1 via the first planetary gears P1, having a gear ratio ρ1 of, for instance, about "0.562". The second planetary gear unit 28 includes a second sun gear S2, second planetary gears P2, a second carrier CA2 supporting the second planetary gears P2 to be rotatable about its axis and about the axis of the second sun gear S2, and a second ring gear R2 meshing with the second sun gear S2 via the second planetary gears P2, having a gear ratio ρ2 of, for instance, about "0.425".

The third planetary gear unit 30 includes a third sun gear S3, third planetary gears P3, a third carrier CA3 supporting the third planetary gears P3 to be rotatable about its axis and about the axis of the third sun gear S3, and the third ring gear R3 meshing with the third sun gear S3 through the third planetary gears P3, having a gear ratio ρ3 of about, for instance, "0.421". With the first sun gear S1, the first ring gear R1, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the gear ratios ρ1, ρ2 and ρ3 are represented by ZS1/ZR1, ZS2/ZR2, and ZS3/ZR3, respectively.

With the automatic shifting portion 20, the first sun gear S1 and the second sun gear S2 are integrally connected to each other and selectively connected to the power transmitting member 18 through a second clutch C2 while selectively connected to the casing 12 through a first brake B1. The first carrier CA1 is selectively connected to the casing 12 through a second brake B2 and the third ring gear R3 is selectively connected to the casing 12 through a third brake B3. The first ring gear R1, the second carrier CA2 and the third carrier CA3 are integrally connected to each other and also connected to an output rotary member 22. The second ring gear R2 and the third sun gear S3 are integrally connected to each other and selectively connected to the power transmitting member 18 through the first clutch C1.

Thus, the automatic shifting portion 20 and the power transmitting member 18 are selectively connected to each other through the first clutch C1 or the second clutch C2 used for establishing a gear shift position in the automatic shifting portion 20. In other words, the first clutch C1 and the second clutch C2 collectively function as an engaging device for switching the operations of the power transmitting member 18 and the automatic shifting portion 20. That is, such an engaging device selectively switches a power transmitting path between the differential portion 11 (transmitting member 18) and the drive wheels 38 in a power transmissive state, enabling a power transfer through the power transmission path, and a power interrupting state interrupting the power transfer through the power transmission path. That is, with at least one of the first clutch C1 and the second clutch C2 being engaged, the power transmitting path is placed in the power transmissive state. In contrast, with both the first clutch C1 and the second clutch C2 being disengaged, the power transmitting path is placed in the power interrupting state.

The switching clutch C0, the first clutch C1, the second clutch C2, the switching brake B0, the first brake B1, the second brake B2 and the third brake B3 are an engaged element, i.e., hydraulic-type frictionally coupling devices used in a vehicular step-variable type automatic transmission of the related art. An example of the frictionally coupling device includes a wet-type multiple-disc type that includes a plurality of superposed friction plates pressed against each other with a hydraulic actuator or a band brake comprised of a rotary drum having an outer circumferential surface on which one band or two bands are wound to be tightened at one ends with a hydraulic actuator to allow associated component parts, between which the rotary drum intervenes, to be selectively connected to each other.

With the shifting mechanism 10 of such a structure, as indicated in an engagement operation table shown FIG. 2, the switching clutch C0, the first clutch C1, the second clutch C2, the switching brake B0, the first brake B1, the second brake B2 and the third brake B3 are selectively engaged in operation. This selectively establishes either one of a 1st-speed gear position (1st-speed gear shift position) to a 5th-speed gear position (5th-speed gear shift position) or one of a reverse-drive gear position (reverse-drive gear shift position) and a neural position with a speed ratios γ (=rotation speed $N_{IN}$ of the input shaft 14/rotation speed $N_{OUT}$ of the output rotary member 22) varying in nearly equal ratio for each gear position.

In particular, with the present embodiment, the power distributing mechanism 16 is comprised of the switching clutch C0 and the switching brake B0, either one of which is engaged in operation. This makes it possible to cause the differential portion 11 to be placed in the continuously variable shifting state enabling the operation as the continuously variable transmission while establishing the fixed shifting state enabling the transmission to operate with the speed ratio maintained at a fixed level. With either one of the switching clutch C0 and the switching brake B0 being engaged in operation, accordingly, the differential portion 11 is placed in the fixed shifting state to cooperate with the automatic shifting portion 20 to allow the shifting mechanism 10 to operate as the step-variable transmission placed in the step-variable shifting state. With both of the switching clutch C0 and the switching brake B0 being disengaged in operation, the differential portion 11 is placed in the continuously variable shifting state to cooperate with the automatic shifting portion 20 to allow the shifting mechanism 10 to operate as the electrically controlled continuously variable transmission placed in the continuously variable shifting state.

In other words, the shifting mechanism 10 is switched to the step-variable shifting state, upon engagement of either one of the switching clutch C0 and the switching brake B0, and the continuously variable shifting state with both of the switching clutch C0 and the switching brake B0 being brought into disengagement. In addition, it can be said that the differential portion 11 is the transmission that can also be switched to the step-variable shifting state and the continuously variable shifting state.

For example, as shown in FIG. 2, under a circumstance where the shifting mechanism 10 is caused to function as the step-variable transmission, engaging the switching clutch C0, the first clutch C1 and the third brake B3 results in the 1st-speed gear position with the speed ratio γ1 having a maximum value of, for instance, about "3.357". Engaging the switching clutch C0, the first clutch C1 and the second brake B2 results in the 2nd-speed gear position with the speed ratio γ2 of, for instance, about "2.180", which is lower than that of the 1st-speed gear position.

Engaging the switching clutch C0, the first clutch C1 and the first brake B1 results in the 3rd-speed gear position with the speed ratio γ3 of, for instance, about "1.424", which is lower than that of the 2nd-speed gear position. Engaging the switching clutch C0, the first clutch C1 and the second clutch C2 results in the 4th-speed gear position with the speed ratio γ4 of, for instance, about "1.000", which is lower than that of the 3rd-speed gear position.

With the first clutch C1, the second clutch C2 and the switching brake B0 being engaged, the 5th-speed gear position is established with the speed ratio γ5 of, for example, about "0.705", which is smaller than that of the 4th-speed gear position. With the second clutch C2 and the third brake B3 being engaged, further, the reverse-drive gear position is established with the speed ratio γR of, for example, about "3.209", which lies at a value between those of the 1st-speed and 2nd-speed gear positions. For the neutral "N" state to be established, for instance, all the clutches and the brakes C0, C1, C2, B0, B1, B2 and B3 are disengaged.

However, for the shifting mechanism 10 to function as the continuously variable transmission, both the switching clutch C0 and the switching brake B0 are disengaged as indicated in the engagement operation table shown in FIG. 2. With such operation, the differential portion 11 is rendered operative to function as the continuously variable transmission and the automatic shifting portion 20, connected thereto in series, is rendered operative to function as the step-variable transmission. This causes the rotation speed input to the automatic shifting portion 20, i.e., the rotation speed of the power transmitting member 18 to be continuously varied for each of the 1st-speed gear position, the 2nd-speed gear position, the 3rd-speed gear position and the 4th-speed gear position. This allows each of the various gear positions to be established in an infinitely variable shifting ratio. Accordingly, a speed ratio can be continuously variable across the adjacent gear positions, making it possible for the shifting mechanism 10 as a whole to obtain an infinitely variable total speed ratio (overall speed ratio) γT.

Figure 3:
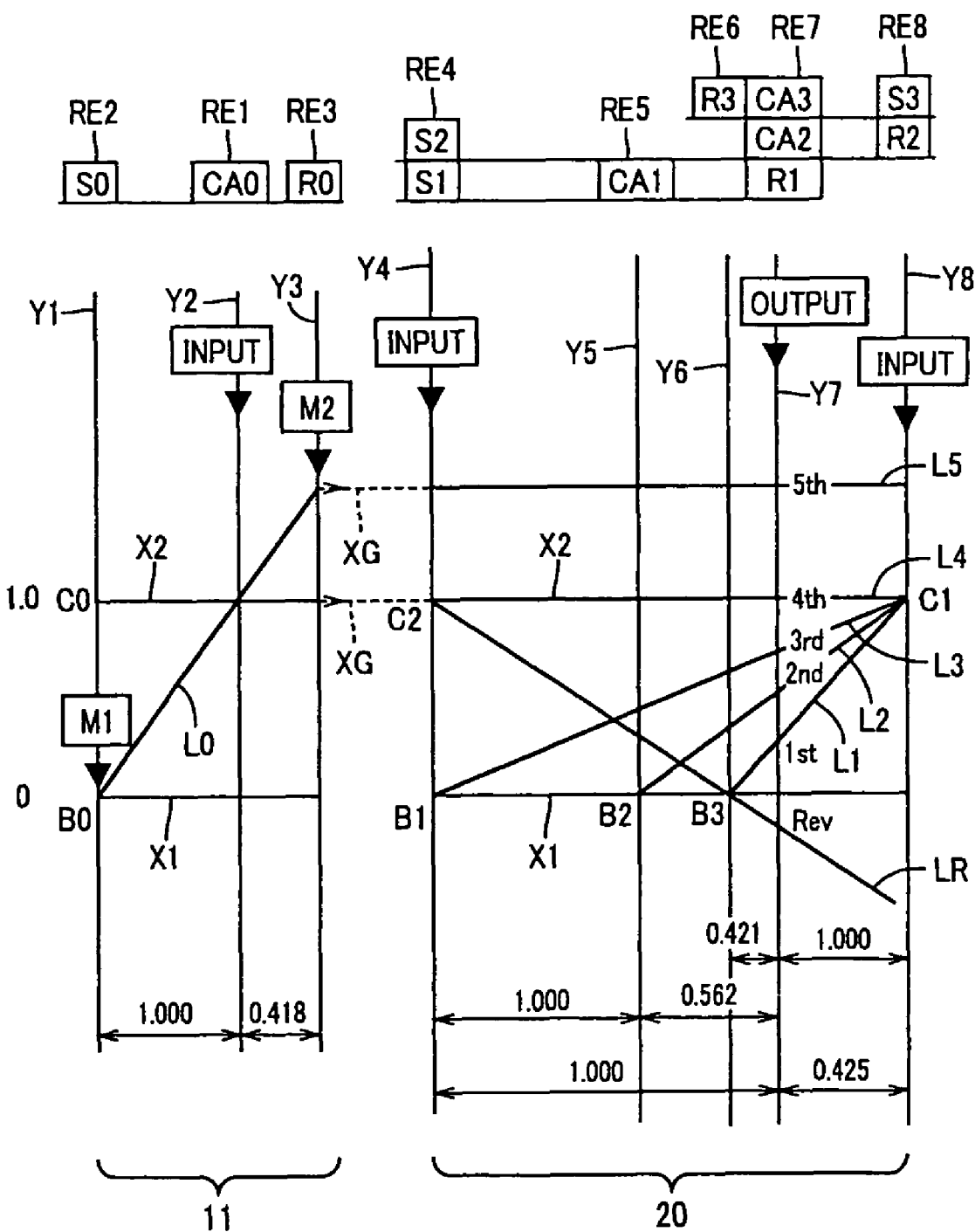
FIG. 3 is a collinear chart illustrating the relative rotation speed of rotary elements in each of different gear positions when the power transmitting apparatus for the hybrid vehicle, shown in FIG. 1, is caused to operate in the step-variable shifting state.

FIG. 3 shows a collinear chart plotted in straight lines that can represent a correlation among the rotation speeds of the various rotary elements available to accomplish clutch engagement states in different modes depending on the gear positions of the shifting mechanism 10 comprised of the differential portion 11, functioning as the continuously variable shifting portion or the first shifting portion, and the automatic shifting portion 20 functioning as the step-variable shifting portion or the second shifting portion. The collinear chart of FIG. 3 is a two-dimensional coordinate system having the horizontal axis, representing the correlation among the gear ratios ρ established with the planetary gear units 24, 26, 28 and 30, and the vertical axis representing relative rotation speeds of the rotary elements. The lowermost line X1 of three horizontal lines indicates the rotation speed laying at a value of "0". An upper horizontal line X2 indicates the rotation speed laying at a value of "1.0", that is, a rotation speed $N_E$ of the engine 8 connected to the input shaft 14. The uppermost horizontal line XG indicates the rotation speed of the power transmitting member 18.

Starting from the left, three vertical lines Y1, Y2 and Y3, corresponding to the three elements of the power distributing mechanism 16 forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. A distance between adjacent ones of the vertical lines Y1, Y2 and Y3 is determined in accordance with the gear ratio ρ0 of the differential-portion planetary gear unit 24.

Starting from the left, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier CA1 corresponding to a fifth rotary element (fifth element) RE5, the third ring gear R3 corresponding to a sixth rotary element (sixth element) RE6, the first ring gear R1 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between the adjacent ones of the vertical lines Y4 to Y8 is determined based on the gear ratios ρ1, ρ2 and ρ3 of the first, second and third planetary gear units 26, 28 and 30.

In the correlation between the vertical lines on the collinear chart, if an interval between the sun gear and the carrier is assigned to a distance corresponding to a value of "1", an interval between the carrier and the ring gear is assigned to a distance corresponding to the gear ratio "ρ" of the planetary gear unit. That is, for the differential portion 11, an interval between the vertical lines Y1 and Y2 is assigned to a distance corresponding to a value of "1" and an interval between the vertical lines Y2 and Y3 is assigned to a distance corresponding to a value of "ρ0". For each of the first, second and third planetary gear units 26, 28 and 30 of the automatic shifting portion 20, further, an interval between the sun gear and the carrier is assigned to a distance corresponding to a value of "1" and an interval between the carrier and the ring gear is assigned to a distance corresponding to the gear ratio "ρ".

Expressing the structure using the collinear chart shown in FIG. 3, the shifting mechanism 10 of the present embodiment takes the form of a structure including the power distributing mechanism 16 (differential portion 11). With the power distributing mechanism 16, the differential-portion planetary gear unit 24 has the first rotary element RE1 (differential-portion carrier CA0) connected to the input shaft 14, i.e., the engine 8, while selectively connected to the second rotary element RE2 (differential-portion sun gear S0) through the switching clutch C0, the second rotary element RE2 connected to the first electric motor M1 while selectively connected to the casing 12 through the switching brake B0, and the third rotary element RE3 (differential-portion ring gear R0) connected to the power transmitting member 18 and the second electric motor M2. Thus, the rotation of the input shaft 14 is transmitted (input) to the automatic shifting portion (step-variable shifting portion) 20 through the power transmitting member 18. An inclined straight line L0, passing across an intersecting point between the lines Y2 and X2, represents the correlation between the rotation speeds of the differential-portion sun gear S0 and the differential-portion ring gear R0.

For example, as the switching clutch C0 and the switching brake B0 are disengaged, the shifting mechanism 10 is switched to the continuously variable shifting state (differential state). In this case, controlling the rotation speed of the first electric motor M1 causes the rotation speed of the differential-portion sun gear S0, represented by an intersecting point between the straight line L0 and the vertical line Y1, to increase or decrease. Under such a state, if the rotation speed of the differential-portion ring gear R0, bound with the vehicle speed V, remains at a nearly fixed level, then, the rotation speed of the differential-portion carrier CA0, represented by the intersecting point between the straight line L0 and the vertical line Y2, is caused to increase or decrease.

With the switching clutch C0 being engaged to couple the differential-portion sun gear S0 and the differential-portion carrier CA0 to each other, the power distributing mechanism 16 is brought into the non-differential state where the three rotary elements are caused to integrally rotate as a unitary unit. Thus, the straight line L0 matches the lateral line X2, so that the power transmitting member 18 is caused to rotate at the same rotation speed as the engine rotation speed $N_E$. In contrast, with the switching brake B0 being engaged to halt the rotation of the differential-portion sun gear S0, the power distributing mechanism 16 is brought into the non-differential state to function as the speed-increasing mechanism. Thus, the straight line L0 describes a state as shown in FIG. 3, under which the rotation of the differential-portion ring gear R0, i.e., the power transmitting member 18, represented by an intersecting point between the straight line L0 and the vertical line Y3, is input to the automatic shifting portion 20 at a rotation speed higher than the engine rotation speed $N_E$.

With the automatic shifting portion 20, the fourth rotary element RE4 is selectively connected to the power transmitting member 18 through the second clutch C2 and selectively connected to the casing 12 through the first brake B1. The fifth rotary element RE5 is selectively connected to the casing 12 through the second brake B2 and the sixth rotary element RE6 is selectively connected to the casing 12 through the third brake B3. The seventh rotary element RE7 is connected to the output rotary member 22 and the eighth rotary element RE8 is selectively connected to the power transmitting member 18 through the first clutch C1.

As shown in FIG. 3, with the automatic shifting portion 20, upon engagement of the first clutch C1 and the third brake B3, the rotation speed of the output rotary member 22 for the 1st-speed gear position is represented by an intersecting point between the inclined straight line L1 and the vertical line Y7 representing the rotation speed of the seventh rotary element RE7 connected to the output rotary member 22. Here, the inclined straight line L1 passes across an intersecting point between the vertical line Y8, indicative of the rotation speed of the eighth rotary element RE8, and the horizontal line X2, and an intersecting point between the vertical line Y6, indicative of the rotation speed of the sixth rotary element RE6, and the horizontal line X1.

Similarly, the rotation speed of the output rotary member 22 for the 2nd-speed gear position is represented by an intersecting point between an inclined straight line L2, determined upon engagement of the first clutch C1 and the second brake B2, and the vertical line Y7 indicative of the rotation speed of the seventh rotary element RE7 connected to the output rotary member 22. The rotation speed of the output rotary member 22 for the 3rd-speed gear position is represented by an intersecting point between an inclined straight line L3, determined upon engagement of the first clutch C1 and the first brake B1, and the vertical line Y7 indicative of the rotation speed of the seventh rotary element RE7 connected to the output rotary member 22. The rotation speed of the output rotary member 22 for the 4th-speed gear position is represented by an intersecting point between a horizontal line L4, determined upon engagement of the first and second clutches C1 and C2, and the vertical line Y7 indicative of the rotation speed of the seventh rotary element RE7 connected to the output rotary member 22.

For the 1st-speed to 4th-speed gear positions, the switching clutch C0 remains engaged. Therefore, a drive force is applied from the differential portion 11, i.e., the power distributing mechanism 16 to the eighth rotary element RE8 at the same rotation speed as that of the engine rotation speed $N_E$. However, in place of the switching clutch C0, if the switching clutch B0 is engaged, then, the drive force is applied from the differential portion 11 to the eighth rotary element RE8 at a higher rotation speed than the engine rotation speed $N_E$. Thus, an intersecting point between a horizontal line L5 and the vertical line Y7 represents the rotation speed of the output rotary member 22 for the 5th-speed gear position. Here, the horizontal line L5 is determined upon engagement of the first clutch C1, the second clutch C2 and the switching brake B0 and the vertical line Y7 represents the rotation speed of the seventh rotary element RE7 connected to the output rotary member 22.

Figure 4:
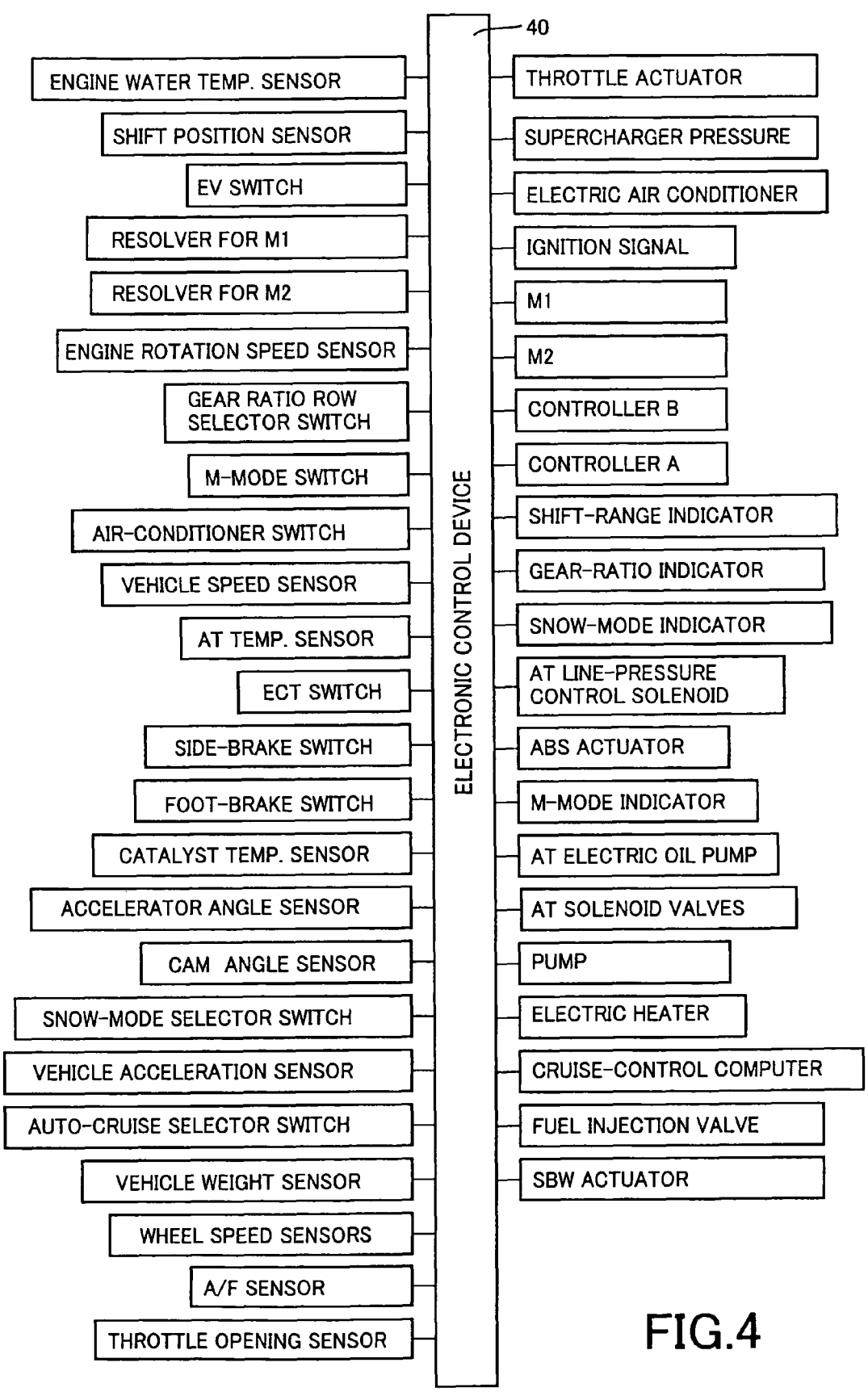
FIG. 4 is a view illustrating input and output signals to be input to or output from an electronic control device incorporated in the power transmitting apparatus for the hybrid vehicle shown in FIG. 1.

FIG. 4 exemplarily shows various input signals applied to an electronic control device 40, serving as a control device for controlling the shifting mechanism 10 which is the power transmitting apparatus for the hybrid vehicle according to the present invention, and various output signals delivered from the electronic control device 40. The electronic control device 40 includes a so-called microcomputer incorporating a CPU, a ROM, a RAM and an input/output interface. With the microcomputer operated to perform signal processing according to programs preliminarily stored in the ROM while utilizing a temporary data storage function of the RAM, hybrid drive controls are conducted to control the engine 8 and the first and second electric motors M1 and M2, while executing drive controls such as shifting controls of the automatic shifting portion 20.

The electronic control device 40 is applied with the various input signals from various sensors and switches shown in FIG. 4. These input signals include a signal indicative of an engine cooling water temperature $TEMP_W$ as temperature of a cooling fluid inside of the engine 8, a signal indicative of a selected shift position $P_{SH}$, a signal from the EV switch commanding to fix a vehicle state in a motor drive mode (EV drive mode) which runs the vehicle by the only second electric motor M2 serving as a power source for the running, a signal indicative of a rotation speed $N_{M1}$ (hereinafter, referred to as a "first-motor rotation speed $N_{M1}$") and a rotation direction of the first electric motor M1 which are detected by rotation speed sensors such as a resolver, a signal indicative of a rotation speed $N_{M2}$ (hereinafter, referred to as a "second-motor rotation speed $N_{M2}$") and a rotation direction of the second electric motor M2 which are detected by the rotation speed sensor 44 such as the resolver (see FIG. 1), a signal indicative of the engine rotation speed $N_E$ representing the rotation speed of the engine 8, a signal indicative of a set value of gear ratio row, a signal commanding an M-mode (manually shift drive mode), and an air-conditioning signal indicative of the operation of an air conditioner, etc.

Besides the input signals described above, the electronic control device 40 is further applied with other various input signals. These input signals include a signal indicative of the vehicle speed V corresponding to the rotation speed $N_{OUT}$ of the output rotary member 22 and the traveling direction of the vehicle which are detected by a vehicle speed sensor 46 (see FIG. 1), a working oil temperature signal indicative of a working oil temperature of the automatic shifting portion 20, a signal indicative of a side brake being operated, a signal indicative of a foot brake being operated, a catalyst temperature signal indicative of a catalyst temperature, an accelerator opening signal indicative of a displacement value $A_{CC}$ of an accelerator pedal corresponding to an output demand value required by a driver, a cam angle signal, a snow mode setting signal indicative of a snow mode being set, an acceleration signal indicative of a fore and aft acceleration of the vehicle, an auto-cruising signal indicative of the vehicle running under an auto-cruising mode, a vehicle weight signal indicative of a weight of the vehicle, a drive wheel velocity signal indicative of a wheel velocity of each drive wheel, and a signal indicative of an air-fuel ratio A/F of the engine 8. Further, the rotation speed sensors 44 and the vehicle speed sensor 46 are sensor which detects not only the rotation speed but the rotation direction. When the automatic shifting portion 20 is in a neutral position during vehicle running, the vehicle speed sensor 46 detects the traveling direction of the vehicle.

The electronic control device 40 generates various control signals to be applied to an engine output control device 43 (refer to FIG. 6) for controlling the engine output. These control signals include, for instance, a drive signal applied to a throttle actuator 97 for controlling an opening degree $\theta_{TH}$ of a throttle valve 96 disposed in an intake manifold 95 of the engine 8, a fuel supply quantity signal to be applied to a fuel injection device 98 for controlling the amount to fuel to be supplied to each cylinder of the engine 8, an ignition signal to be applied to an ignition device 99 for commanding an ignition timing of the engine 8, a supercharger pressure regulating signal for adjusting a supercharger pressure level, an electric air-conditioner drive signal for actuating an electric air conditioner, and command signals for commanding the operations of the first and second electric motors M1 and M2.

Besides the control signals described above, the electronic control device 40 generates various output signals. These output signals include a shift-position (selected operating position) display signal for activating a shift indicator, a gear-ratio display signal for providing a display of the gear ratio, a snow-mode display signal for providing a display of a snow mode under operation, an ABS actuation signal for actuating an ABS actuator for preventing slippages of the drive wheels during a braking effect, an M-mode display signal for displaying the M-mode being selected, drive command signals for actuating an electric hydraulic pump 88 (see FIG. 6) serving as a hydraulic pressure source of the hydraulically operated control circuit 42 (see FIG. 6), valve command signals for actuating a line pressure control electromagnet valve 86 (see FIG. 6) which can control the line pressure, valve command signals for actuating the engagement control electromagnet valves 84 (see FIG. 6) incorporated in a hydraulically operated control circuit 42 (see FIG. 6), which can supply the line pressure (original pressure) from the electric hydraulic pump 88 with reduced pressure to each engagement elements (the hydraulically operated frictional engaging devices) of the differential portion 11 and the automatic shifting portion 20, and which is provided in every hydraulic circuit of each engagement element to control the hydraulic actuators of each engagement element, a signal for driving an electric heater, signals applied to a cruise-control computer, and command signal for controlling a SBW (shift-by-wire) actuator to operate manual valve 90 (see FIG. 6) which switches the hydraulic circuit provided inside of the hydraulically operated control circuit 42, etc.

Figure 5:
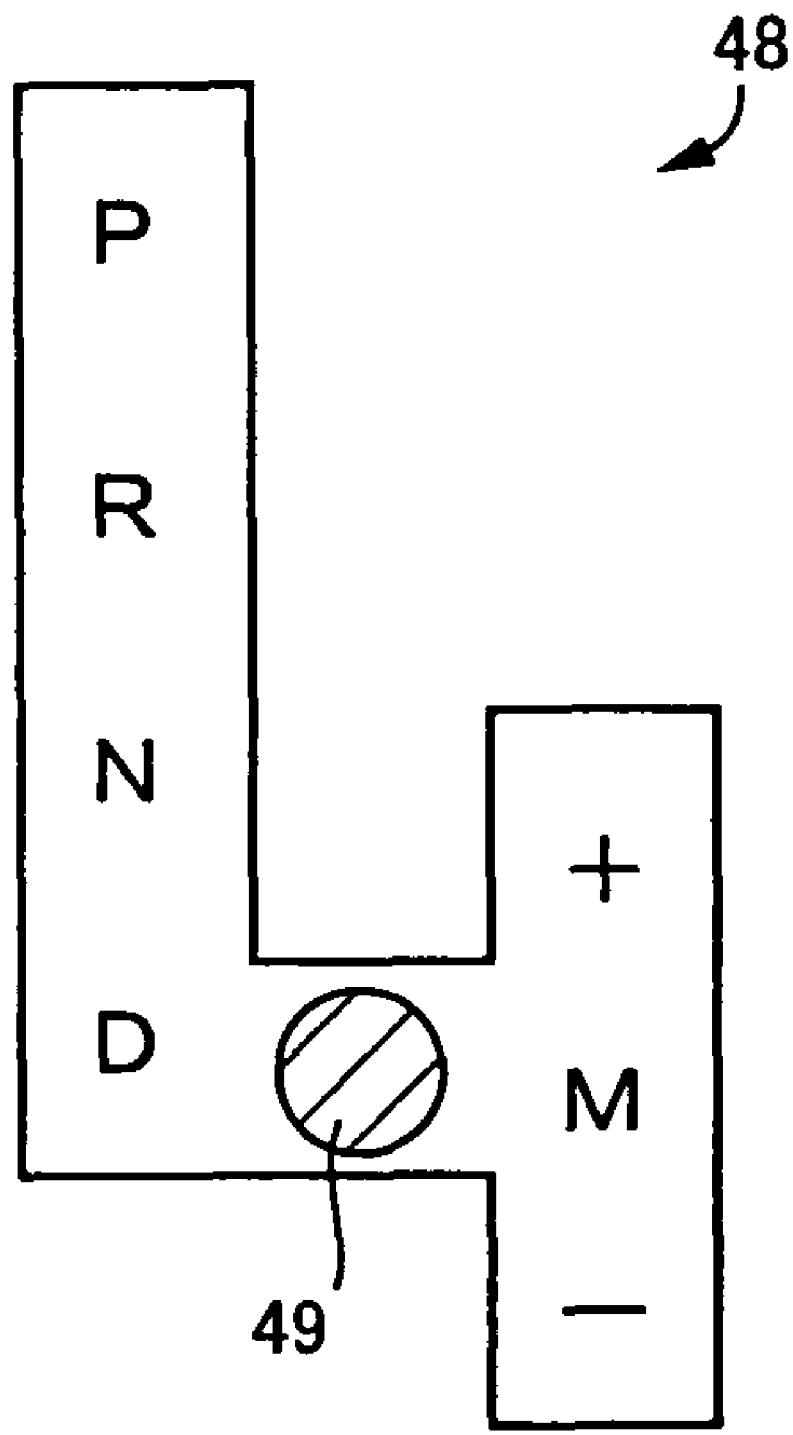
FIG. 5 is a view showing one sample of a shift operating device provided with a shift lever for operating to select one of plural kinds of shift positions.

FIG. 5 is a view showing one sample of a shift operating device 48, serving as a switching device, which is manually operated to select one of the shift positions $P_{SH}$ of multiple kinds. The shift operating device 48 includes a shift lever 49 mounted aside, for example, a driver's seat to be manually operated to select one of the shifting positions $P_{SH}$ of the plural kinds.

The shift lever 49 has a structure arranged to be selectively shifted in manual operation to be set to one of a parking position "P" (Parking) under which the shifting mechanism 10, i.e., the automatic shifting portion 20, is placed in the neutral state interrupting the power transmitting path of the shifting mechanism 10, i.e., the automatic shifting portion 20 and also the output rotary member 22 of the automatic shifting portion 20 is locked, a reverse drive running position "R" (Reverse) for the vehicle to run in a reverse drive mode, a neutral position "N" (Neutral) for the neutral state to be established under which the power transmitting path of the shifting mechanism 10 is interrupted, a forward drive automatic shift position "D" (Drive) for an automatic shift control to be executed within a varying range of the total speed ratio $\gamma T$ that can be shifted with the shifting mechanism 10, and a forward drive manual shift position "M" (Manual) under which a manual shift running mode (manual mode) is established to set a so-called shift range that limits the shift gear positions in a high speed range during the execution of the automatic shift control.

In conjunction with the shift lever 49 being manually operated to each of the shift positions $P_{SH}$, for instance, the hydraulic control circuit 42 is electrically switched in such a way to establish each of the gear shift positions such as the reverse drive position "R", the neutral position "N" and the forward drive position "D" as shown in the engagement operation table shown in FIG. 2.

Among the various shift positions $P_{SH}$ covering "P" to "M" positions, the "P" and "N" positions represent the non-running positions selected when no intension is present to run the vehicle. For the "P" and "N" positions to be selected, both the first and second clutches C1 and C2 are disengaged, as shown in, for example, the engagement operation table of FIG. 2, and non-drive positions are selected to place the power transmitting path in the power cutoff state. This causes the power transmitting path of the automatic shifting portion 20 to be interrupted, disenabling the vehicle to be driven.

The "R", "D" and "M" positions represent running positions selected when the vehicle is caused to run. These shift positions also represent drive positions selected when switching the power transmitting path to the power transmissive state under which at least one of the first and second clutches C1 and C2 is engaged as shown in, for instance, the engagement operation table of FIG. 2. With such shifting positions being selected, the power transmitting path of the automatic shifting portion 20 is connected to enable the vehicle to be driven.

More particularly, with the shift lever 49 manually operated from the "P" position or the "N" position to the "R" position, the second clutch C2 is engaged so that the power transmitting path of the automatic shifting portion 20 is switched from the power cutoff state to the power transmissive state. With the shift lever 49 manually operated from the "N" position to the "D" position, at least the first clutch C1 is engaged, causing the power transmitting path of the automatic shifting portion 20 to be switched from the power cutoff state to the power transmissive state.

With the shift lever 49 manually operated from the "R" position to the "P" position or the "N" position, the second clutch C2 is disengaged, causing the power transmitting path of the automatic shifting portion 20 to be switched from the power transmissive state to the power cutoff state. With the shift lever 49 manually operated from the "D" position to the "N" position, the first and second clutches C1 and C2 are disengaged, causing the power transmitting path of the automatic shifting portion 20 to be switched from the power transmissive state to the power cutoff state.

Further, the hydraulic control circuit 42 includes a manual valve 90 functioning as a hydraulic pressure switching valve operable to block the hydraulic pressure being supplied to, for instance, the automatic shifting portion 20. The manual valve 90 is mechanically connected to a motor actuator operative to be driven in response to an electrical command signal delivered via a wire such as a so-called shift-by-wire (SBW) such that the manual valve 90 is basically actuated in conjunction with the shift lever 49.

With the shift lever 49 operated causing the shift-by-wire to actuate the manual valve 90, a hydraulic circuit, incorporated in the hydraulic control circuit 42, is controlled. With the gear position placed in, for instance, the "D" and "M" positions, a forward drive hydraulic pressure is output, making it possible for a vehicle to run in a forward drive mode while permitting a shift in one of a 1st-speed gear position to a 5th-speed gear position in forward drive gear positions. With the gear position placed in the "R" position, a reverse drive hydraulic pressure is output, making it possible for the vehicle to run in a reverse drive mode. With the gear position placed in the "P" and "N" positions, none of the forward and reverse drive hydraulic pressures is output. In this case, the power transmitting path of the automatic shifting portion 20 is placed in a power interrupting state regardless of whether engagement-control electromagnet valves 84 (see FIG. 6), incorporated in hydraulic pressure delivery paths of engaging elements C1, C2, B1, B2 and B3 of the automatic shifting portion 20, are operated.

Figure 7:
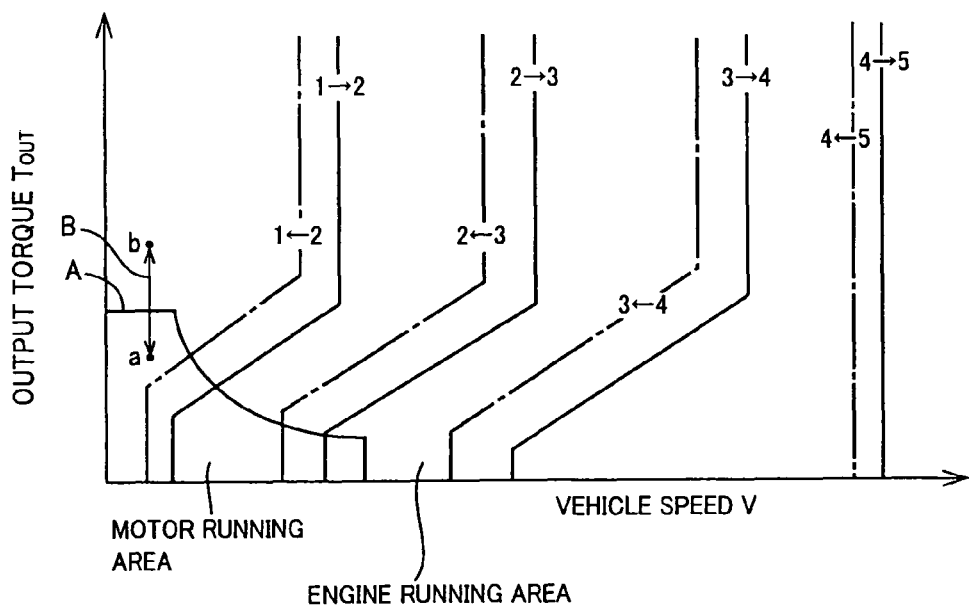
FIG. 7 is a view representing one example of a preliminarily stored shifting diagram, plotted on a two-dimensional coordinate in terms of parameters including a vehicle speed and output torque, based on which the operation is executed whether to a shifting is executed in an automatic shifting portion, and one example of a preliminarily stored drive-force source switching diagram having a boundary line between an engine drive region and a motor drive region based on which an engine drive mode and a motor drive mode is switched in the power transmitting apparatus for the hybrid vehicle shown in FIG. 1.

FIG. 6 is a functional block diagram illustrating an essential part of a control function to be performed with the electronic control device 40. In FIG. 6, step-variable shifting control means 54 functions as shifting control means for the shifting the shifting the automatic shifting portion 20. For instance, the step-variable shifting control means 54 discriminates whether to execute the shifting in the automatic shifting portion 20 on the basis of a vehicle condition represented by the vehicle speed V and the demanded output torque $T_{OUT}$ for the automatic shifting portion 20 by referring to the relationships (including the shifting diagram and the shifting map), preliminarily stored in memory means 56, which are plotted in solid lines and single dot lines as shown in FIG. 7. That is, the step-variable shifting control means 54 discriminates a shifting position to be shifted in the automatic shifting portion 20, thereby causing the automatic shifting portion 20 to execute the shifting so as to obtain the discriminated shifting position. When this takes place, the step-variable shifting control means 54 outputs a command (shifting—output command) to the hydraulic control circuit 42 for engaging and/or disengaging the hydraulic-type frictionally coupling devices, excepting the switching clutch C0 and the switching brake B0, so as to achieve a desired shifting position in accordance with, for instance, the engagement operation table shown in FIG. 2.

Hybrid control means 52 renders the engine 8 operative in an operating region at high efficiency under the infinitely variable shifting state of the shifting mechanism 10, i.e., the differential state of the differential portion 11. At the same time, the hybrid control means 52 causes the engine 8 and the second electric motor M2 to deliver drive forces at varying distributing rates while causing the first electric motor M1 to generate electric power at a varying rate for a reactive force to be generated at an optimum value, thereby controlling the speed ratio $\gamma 0$ of the differential portion 11 placed in the electrically controlled continuously variable transmission.

For instance, during the running of the vehicle at a current vehicle speed, the hybrid control means 52 calculates a target (demanded) output of the vehicle by referring to the displacement value $A_{CC}$ of the accelerator pedal and the vehicle speed V that collectively represents the output demanded value intended by the driver. Then, the hybrid control means 52 calculates a demanded total target output based on the target output and a charging request value of the vehicle. In order to obtain the total target output, the hybrid control means 52 calculates a target engine output with taking account of the transmitting a loss, loads on auxiliary units and assisting torque of the second electric motor M2, etc. Then, the hybrid control means 52 controls the engine 8 so as to provide the engine rotation speed $N_E$ and engine torque $T_E$ such that the target engine output is obtained, while controlling the first electric motor M1 to generate electric power at a proper power rate.

The hybrid control means 52 executes a hybrid control with taking account of the gear position of the automatic shifting portion 20 so as to obtain power performance and improved fuel consumption. During such a hybrid control, the differential portion 11 is rendered operative to function as the electrically controlled continuously variable transmission for the purpose of matching the engine rotation speed $N_E$, determined for the engine 8 to operate at a high efficiency, to the rotation speed of the power transmitting member 18 determined based on the vehicle speed V and the selected gear position of the automatic shifting portion 20.

To this end, the hybrid control means 52 preliminarily stores therein an optimum fuel economy curve (including a fuel economy map and relevant relationshipships) of the engine 8 preliminarily determined on an experimental basis such that, during the running of the vehicle under the continuously variable shifting state, the vehicle has drivability and fuel economy performance in compatibility on a two-dimensional coordinate with parameters including, for instance, the engine rotation speed $N_E$ and output torque (engine torque) $T_E$ of the engine 8.

In order to cause the engine 8 to operate on such an optimum fuel economy curve, a target value on the total speed ratio γT of the shifting mechanism 10 is determined so as to obtain engine torque $T_E$ and the engine rotation speed $N_E$ for the demanded engine output to be generated so as to satisfy, for instance, the target output (total target output and demanded drive force). To achieve such a target value, the hybrid control means 52 controls the speed ratio γ0 of the differential portion 11, while controlling the total speed ratio γT within a variable shifting range at a value, for instance, ranging from 13 to 0.5.

During such hybrid control, the hybrid control means 52 allows electric energy, generated by the first electric motor M1, to be supplied to a battery 60 and the second electric motor M2 through an inverter 58. This allows a major part of the drive force, delivered from the engine 8, to be mechanically transmitted to the power transmitting member 18 and the rest of the drive force of the engine 8 is delivered to the first electric motor M1 to be consumed thereby for conversion to electric power. The resulting electric energy is supplied through the inverter 58 to the second electric motor M2, which in turn is driven to provide a drive force for delivery to the power transmitting member 18. Equipments, involved in the operation of generating electric energy and the operation causing the second electric motor M2 to consume electric energy, establish an electric path in which the part of the drive force, delivered from the engine 8, is converted to electric energy which in turn is converted into mechanical energy.

The hybrid control means 52 functionally includes engine output control means for executing an output control of the engine 8 so as to provide the demanded engine output. The engine output control means allows the throttle actuator 97 to perform a throttle control so as to controllably open or close the electronic throttle valve 96. In addition, the engine output control means outputs commands to the engine output control device 43 so as to cause the fuel injection device 98 to control the fuel injection quantity and fuel injection timing for performing a fuel injection control while permitting the ignition device 99, such as an igniter or the like, to control an ignition timing for an ignition timing control. These commands are output in a single mode or a combined mode. For instance, the hybrid control means 52 drives the throttle actuator 97 in response to the acceleration opening signal Acc by fundamentally referring to the preliminarily stored relationship, not shown, so as to execute the throttle control such that the greater the accelerator opening $A_{cc}$, the greater will be the throttle valve opening $\theta_{TH}$.

A solid line A, shown in FIG. 7, represents a boundary line between an engine drive region and a motor drive region for the engine 8 and an electric motor, i.e., for instance, the second electric motor M2 to be selectively switched as a drive force source for the vehicle to perform a startup/running (hereinafter referred to as "running"). In other words, the boundary line is used for switching a so-called engine drive mode, in which the engine 8 is caused to act as a running drive force source for starting up/running (hereinafter referred to as "running") the vehicle, and a so-called motor drive mode in which the second electric motor M2 is caused to act as a drive force source for running the vehicle.

The preliminarily stored relationship, having the boundary line (in the solid line A) shown in FIG. 7 for the engine drive region and the motor drive region to be switched, represents one example of a drive-force source switching diagram (drive force source map), formed on a two-dimensional coordinate, which includes parameters such as the vehicle speed V and output torque $T_{OUT}$ representing a drive force correlation value. Memory means 56 preliminarily stores such a drive-force source switching diagram together with the shifting diagram (shifting map) designated by, for instance, the solid line and the single dot line in FIG. 7.

The hybrid control means 52 determines which of the motor drive region and the engine drive region is to be selected based on the vehicle condition, represented by the vehicle speed V and demanded torque output $T_{OUT}$ by referring to, for instance, the drive-force source switching diagram shown in FIG. 7, thereby executing the motor drive mode or the engine drive mode. Thus, the hybrid control means 52 executes the motor drive mode at relatively low output torque $T_{OUT}$, i.e., low engine torque $T_E$, at which an engine efficiency is generally regarded to be lower than that involved a high torque region, or a relatively low vehicle speed range of the vehicle speed V, i.e., under a low load region as will be apparent from FIG. 7.

During such a motor drive mode, the hybrid control means 52 renders the differential portion 11 operative to perform an electrical CVT function (differential function) for controlling the first-motor rotation speed $N_{M1}$ at a negative rotation speed, i.e., at an idling speed to maintain the engine rotation speed $N_E$ at a zeroed or nearly zeroed level, thereby minimizing a drag of the engine 8, remained under a halted state, for providing improved fuel economy.

The hybrid control means 52 includes engine-startup stop control means 66 that switches an operating state of the engine 8 between a drive state and a stop state to select one of the engine drive mode and the motor drive mode. As used herein, the term "switches" refers to an operation in which the engine 8 is started up or stopped in operation. With the hybrid control means 52 executed the operation based on the vehicle condition by referring to, for instance, the drive-force source switching diagram shown in FIG. 7 to determine that the motor drive mode and the engine drive mode need to be switched, the engine-startup stop control means 66 executes the operation to start up or stop the engine 8.

If the accelerator pedal is depressed in operation to cause an increase in demanded engine output torque $T_{OUT}$, the vehicle condition varies from the motor drive region to the engine drive region as shown by a transition in points "a"→"b" on a solid line B in FIG. 7. When this takes place, the engine-startup stop control means 66 turns on the first electric motor M1 to raise the first-motor rotation speed $N_{M1}$. That is, the first electric motor M1 is rendered operative to function as a starter. This allows the engine 8 to start up with an increase in the engine rotation speed $N_E$ During such operation, the engine-startup stop control means 66 causes the ignition device 99 to initiate an ignition at a given engine rotation speed $N_E'$, i.e., for instance, at an engine rotation speed $N_E$ enabling an autonomous rotation, after which the hybrid control means 52 switches the motor drive mode to the engine drive mode.

During such operation, the engine-startup stop control means 66 may cause the first-motor rotation speed $N_{M1}$ to immediately raise for increasing the engine rotation speed $N_E$ UP to the given engine rotation speed $N_E'$. This can immediately avoid the occurrence of a resonating region from an engine rotating speed region remaining below an idling rotation speed $N_{IDLE}$ that is well known, thereby suppressing the possibility of the engine 8 vibrating at startup thereof. Further, under the normal operating state, the second electric motor M2 may rotate only one direction, but the first electric motor M1 may rotate two directions, i.e., normal and reverse directions. The same rotary direction of the first electric motor M1 as of the second electric motor M2 is defined as the normal rotary direction of the first electric motor M1. Therefore, when the rotation speed $N_{M1}$ is lowered to nearly zeroed level in the reverse direction rotation of the first electric motor M1, the rotation speed increases with consideration the rotary direction (positive/negative of reference), so that the first-motor rotation speed $N_{M1}$ is increased.

If the accelerator pedal is released with a decrease in demanded engine output torque $T_{OUT}$, the vehicle condition varies from the engine drive region to the motor drive region as shown by another transition in points "b"→"a" on the solid line B in FIG. 7. When this takes place, the engine-startup stop control means 66 causes the fuel injection device 98 to interrupt the supply of fuel to the engine 8. That is, a fuel cutoff operation is executed to stop the engine 8. In such a way, the hybrid control means 52 switches the engine drive mode to the motor drive mode. During such an operation, the engine-startup stop control means 66 may execute the operation to immediately lower the first-motor rotation speed $N_{M1}$ for immediately lowering the engine rotation speed $N_E$ to a zeroed or nearly zeroed level. This immediately avoids the engine 8 from entering the resonating region, thereby suppressing the possibility of the engine 8 vibrating at startup thereof.

In an alternative, the engine-startup stop control means 66 may execute the operation to stop the engine 8 upon executing an operation to lower the first-motor rotation speed $N_{M1}$ to decrease the engine rotation speed $N_E$ on a stage prior to the fuel cutoff operation being executed for effectuating the fuel cutoff operation at the given engine rotation speed $N_E'$.

Further, even under the engine drive region, the hybrid control means 52 may execute the operation to allow the second electric motor M2 to be supplied with electric energy, generated by the first electric motor M1, and/or electric energy delivered from the battery 60 via the electric path mentioned above. This causes the second electric motor M2 to be driven for performing a torque assisting operation to assist the drive force of the engine 8. Thus, for the illustrated embodiment, the term "engine drive mode" may refer to an operation covering the engine drive mode and the motor drive mode in combination.

Further, the hybrid control means 52 can cause the differential portion 11 to perform the electrical CVT function through which the engine 8 can be maintained under the operating state regardless of the vehicle left in a halted condition or a low speed condition. For instance, if a drop occurs in a state of charge SOC of the battery 60 during the halt of the vehicle with a need occurring on the first electric motor M1 to generate electric power, the drive force of the engine 8 drives the first electric motor M1 to generate electric power with an increase in the rotation speed of the first electric motor M1. Thus, even if the second-motor rotation speed $N_{M2}$, uniquely determined with the vehicle speed V, is zeroed (nearly zeroed) due to the halted condition of the vehicle, the power distributing mechanism 16 performs the differential action, causing the engine rotation speed $N_E$ to be maintained at a level beyond an autonomous rotation speed.

The hybrid control means 52 executes the operation to cause the differential portion 11 to perform the electrical CVT function for controlling the first-motor rotation speed $N_{M1}$ and the second-motor rotation speed $N_{M2}$ to maintain the engine rotation speed $N_E$ at an arbitrary level regardless of the vehicle remaining under the halted or running state. As will be understood from the collinear chart shown in FIG. 3, for instance, when raising the engine rotation speed $N_E$, the hybrid control means 52 executes the operation to maintain the second-motor rotation speed $N_{M2}$, bound with the vehicle speed V, at a nearly fixed level while raising the first-motor rotation speed $N_{M1}$.

In placing the shifting mechanism 10 in the step-variable shifting state, increasing-speed gear-position determining means 62 determines which of the switching clutch C0 and the switching brake B0 is to be engaged. To this end, the increasing-speed gear-position determining means 62 executes the operation based on, for instance, the vehicle condition according to the shifting diagram, shown in FIG. 7, which is preliminarily stored in the memory means 56, to determine whether or not a gear position to be shifted in the shifting mechanism 10 is an increasing-speed gear position, i.e., for instance, a 5th-speed gear position.

Switching control means 50 switches the engaging and/disengaging states of the differential state switching device (switching clutch C0 and switching brake B0) based on the vehicle condition, thereby selectively executing a switchover between the continuously variable shifting state and the step-variable shifting state, i.e., between the differential state and the locked state. For instance, the switching control means 50 executes the operation based on the vehicle condition, represented with the vehicle speed V and demanded output torque $T_{OUT}$ from the point of improved fuel consumption, determining whether to switch the shifting state of the shifting mechanism 10 (differential portion 11), thereby executing the operation to selectively switch the shifting state to one of the continuously variable shifting state and the step-variable shifting state.

More particularly, if the determination is made that the shifting mechanism 10 lies in the step-variable shifting control region, then, the switching control means 50 outputs a signal to the hybrid control means 52 for disenabling or interrupting the hybrid control or the continuously variable shifting control, while permitting the step-variable shifting control means 54 to perform the shifting for the step-variable shifting operation that has been preliminarily determined. When this takes place, the step-variable shifting control means 54 allows the automatic shifting portion 20 to perform the automatic shifting in accordance with, for instance, the shifting diagram shown in FIG. 7 and preliminarily stored in the memory means 56.

For instance, the engagement operation table, shown in FIG. 2 and preliminarily stored in the memory means 56, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 10, i.e., the differential portion 11 and the automatic shifting portion 20, functions as a so-called step-variable automatic transmission, thereby establishing the gear positions according to the engagement operation table shown in FIG. 2.

For instance, if the increasing-speed gear-position determining means 62 determines that the 5th-gear position is to be selected, the shifting mechanism 10 as a whole can obtain a so-called overdrive-gear position on an increasing-speed gear position with a speed ratio less than "1.0" as a whole. To this end, the switching control means 50 outputs a command to the hydraulic control circuit 42 for disengaging the switching clutch C0 and engaging the switching brake B0 to allow the differential portion 11 to function as an auxiliary power transmission with a fixed speed ratio γ0, i.e., for instance, the speed ratio γ0 equal to "0.7".

If the increasing-speed gear-position determining means 62 determines that no 5th-gear position is to be selected, the shifting mechanism 10 as a whole can obtain a decreasing-speed gear position with a speed ratio of "1.0" or more. To this end, the switching control means 50 outputs another command to the hydraulic control circuit 42 for engaging the switching clutch C0 and disengaging the switching brake B0 to allow the differential portion 11 to function as the auxiliary power transmission with the fixed speed ratio γ0, i.e., for instance, the speed ratio γ0 equal to "1".

Thus, the switching control means 50 causes the shifting mechanism 10 to be switched in the step-variable shifting state under which the operation is executed to selectively switch the gear positions of two kinds to either one gear position. With the differential portion 11 rendered operative to function as the auxiliary power transmission while the automatic shifting portion 20, connected to the differential portion 11 in series, is rendered operative to function as the step-variable transmission, the shifting mechanism 10 as a whole is rendered operative to function as the so-called step-variable automatic transmission.

On the contrary, if the switching control means 50 determines that the shifting mechanism 10 remains in the continuously variable shifting control region to be switched, the shifting mechanism 10 as a whole can obtain the continuously variable shifting state. To this end, the switching control means 50 outputs a command to the hydraulic control circuit 42 for disengaging both the switching clutch C0 and the switching brake B0 so as to place the differential portion 11 in the continuously variable shifting state to enable an infinitely variable shifting operation to be executed. Simultaneously, the switching control means 50 outputs a signal to the hybrid control means 52 for permitting the hybrid control to be executed, while outputting a given signal to the step-variable shifting control means 54. As used herein, the term "given signal" refers to a signal, by which the shifting mechanism 10 is fixed to a gear position for a predetermined continuously variable shifting state, or a signal for permitting the automatic shifting portion 20 to perform the automatic shifting according to, for instance, the shifting diagram, shown in FIG. 7, which is preliminarily stored in the memory means 56.

In this case, the step-variable shifting control means 54 performs the automatic shifting upon executing the operation excepting the operations-to engage the switching clutch C0 and the switching brake B0 in the engagement operation table shown in FIG. 2. This causes the switching control means 50 to switch the differential portion 11 to the continuously variable shifting state to function as the continuously variable transmission, while rendering the automatic shifting portion 20, connected to the differential portion 11 in series, operative to function as the step-variable transmission. This allows a drive force to be obtained with an appropriate magnitude. Simultaneously, the rotation speed input to the automatic shifting portion 20, i.e., the rotation speed of the power transmitting member 18 is continuously varied for each gear position of the 1st-speed, 2nd-speed, 3rd-speed and 4th-speed positions of the automatic shifting portion 20, enabling the respective gear positions to be obtained in infinitely variable speed ratio ranges. Accordingly, since the speed ratio is continuously variable across the adjacent gear positions, the shifting mechanism 10 as a whole can obtain the overall speed ratio γT in an infinitely variable mode.

Now, FIG. 7 will be described more in detail. FIG. 7 is a view showing the relationships (shifting diagram and shifting map), preliminarily stored in the memory means 56, based on which the shifting of the automatic shifting portion 20 is determined, and representing one example of the shifting diagram plotted on a two-dimensional coordinate with parameters including the vehicle speed V and demanded output torque $T_{OUT}$ indicative of the drive force correlation value. In FIG. 7, the solid lines represent upshift lines and single dot lines represent downshift lines.

When a malfunction or functional deterioration occurs in electrical control equipment such as an electric motor or the like used for rendering the differential portion 11 operative as the electrically controlled continuously variable transmission, the switching control means 50 may be configured to place the shifting mechanism 10 in the step-variable shifting state on a priority basis for the purpose of ensuring the running of the vehicle to even if the shifting mechanism 10 remains in the continuously variable control region. As used herein, the term "malfunction or functional deterioration in electrical control equipment" refers to a vehicle condition in which: functional degradation occurs in equipment related to the electrical path involved in the operation of the first electric motor M1 to generate electric energy and the operation executed in converting such electric energy to mechanical energy; that is, failures or functional deteriorations, caused by a breakdown or low temperature, occur in the first electric motor M1, the second electric motor M2, the inverter 58, the battery 60 and transmission paths interconnecting these component parts.

As used herein, the term "drive force correlation value" described above refers to a parameter corresponding to the drive force of the vehicle in one-to-one relation. Such a parameter may include not only drive torque or drive force delivered to the drive wheels 38 but also: output torque $T_{OUT}$ of the automatic shifting portion 20; engine output torque $T_E$; an acceleration value of the vehicle; an actual value such as engine output torque $T_E$ calculated based on, for instance, the accelerator operating or the throttle valve opening $\theta_{TH}$ (or an intake air quantity, an air/fuel ratio or a fuel injection amount) and the engine rotation speed $N_E$; or an estimated value such as engine output torque $T_E$; or the demanded output torque $T_{OUT}$ for the automatic shifting portion 20 or demanded vehicle drive force calculated based on a displacement value of the accelerator pedal actuated by the driver or the throttle valve operating or the like. In addition, the drive torque may be calculated upon taking a differential ratio and a radius of each drive wheel 38 into consideration by referring to output torque $T_{OUT}$ or the like or may be directly detected using a torque sensor or the like. This is true for each of other torques mentioned above.

Figure 8:
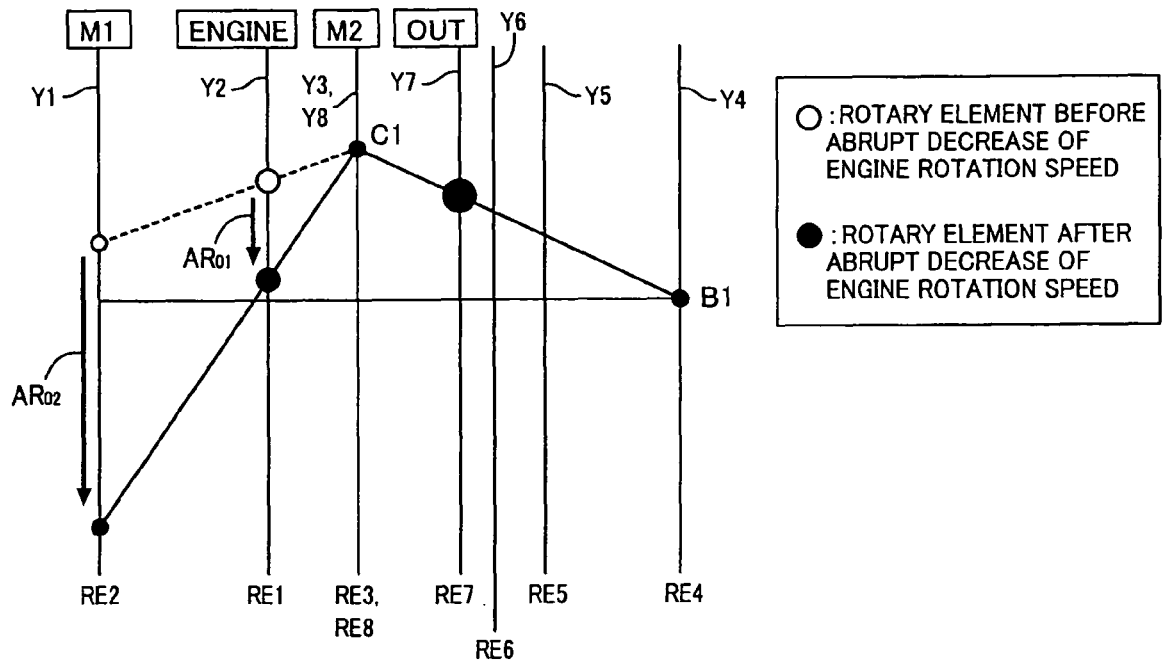
FIG. 8 is a collinear chart, illustrating how the first electric motor reaches a high-speed rotation with reference to an exemplary case, wherein in the power transmitting apparatus for the hybrid vehicle, a switching clutch and a switching brake are disengaged in the differential portion, and in the automatic shifting portion remaining under a 3rd-speed gear position with a first brake and a first clutch remaining engaged, which includes vertical lines Y1 to Y8 common to those of FIG. 3.

If a failure state occurs in the engine 8 during an engine drive mode, it is conceived that a rapid drop i.e. decrease occurs in the engine rotation speed $N_E$. In such a case, it is considered that due to the rapid drop in the engine rotation speed $N_E$ and the differential action of the differential portion 11, the first electric motor M1 is caused to reach a high-speed rotation in a negatively rotating direction as shown in FIG. 8. FIG. 8 represents a collinear chart illustrating how the first electric motor M1 is caused to reach the high-speed rotation with reference to an exemplary case wherein the switching clutch C0 and the switching brake B0 are disengaged in the differential portion 11, and the automatic shifting portion 20 is placed in the 3rd-speed gear position with the first brake B 1 and the first clutch C I remained under engaging states.

Referring now to FIG. 8, description is made of how the first electric motor M1 is caused to reach the high-speed rotation. As the rapid drop occurs in the engine rotation speed $N_E$ as indicated by an arrow $AR_{01}$, a second motor rotation speed $N_{M2}$ does not vary in prompt response to such a rapid drop because the second motor rotation speed $N_{M2}$ is bound with the drive wheels 38 (representing a vehicle speed V). The rapid drop in the engine rotation speed $N_E$ causes the first electric motor M1 to transiently rotate at the high speed in the negatively rotating direction as indicated by an arrow $AR_{O2}$.

To address such a defect, as shown in FIG. 8, a control is executed so as to prevent the first electric motor M1 from transiently rotating at such a high speed. Hereunder, detailed description is given with a focus on such a control operation.

Turning back to FIG. 6, running state determining means 70 makes a query as to whether the running state is established in the engine drive mode. If the running state determining means 70 determines that the running state is established in the engine drive mode, then the rotation-stop determining means 72 makes a query as to whether a first rotary element (first rotary element) RE1, connected to the engine 8, is caused to stop or decrease in direction to stop. More particularly, since the rotation speed of the first rotary element RE1 is namely the engine rotation speed $N_E$, the rotation-stop determining means 72 makes a query as to whether the rapid drop occurs in the engine rotation speed $N_E$ such that a variation rate $A_E$ of the engine rotation speed $N_E$ per unit of time, i.e., the engine rotation acceleration $A_E$ exceeds a given rotation-speed variation-rate determining value $X_{AE}$.

The rotation-stop determining means 72 serves to determine as to whether to execute a control to prevent the first electric motor M1 from increasing to a high rotation speed exceeding a normally supposed rotation speed due to the rapid drop in engine rotation speed $N_E$. The rotation-stop determining means 72 preferably makes a positive determination when the rapid drop occurs in the engine rotation speed $N_E$ under a situation not only when the engine rotation acceleration $A_E$ exceeds the rotation-speed variation-rate determining value $X_{AE}$ but also when the engine rotation speed $N_E$ is deviated from a predetermined error permissible range by referring to a target value based on a target value of the electronic control device 40. As used herein, the expression "the situation under which the rapid drop occurs in the engine rotation speed $N_E$" refers to a circumstance where a failure occurs in the engine 8 to cause a sudden decrease in the engine rotation speed $N_E$, i.e., a situation where a rapid drop unintentionally occurs in the engine rotation speed $N_E$ like, for instance, a situation under which a shaft of the engine 8 becomes defective, or the engine 8 is inoperative under a high load state.

As used herein, further, the term "rotation-speed variation-rate determining value $X_{AE}$" refers to a predetermined determination value based on which a query is made as to whether the rapid drop occurs in the engine rotation speed $N_E$ at a rate required for executing an engaging element control. As used herein, the term "engaging element control" refers to an operation to control an engaging element forming part of a power transmitting path extending from an output shaft (power transmitting member 18) of the differential portion 11 to the drive wheels 38. That is, the engaging element, remaining engaged in the automatic shifting portion 20, is brought into a disengaged state or a slip state (slipping state). Moreover, since the determination is made that the rapid drop occurs in the engine rotation speed $N_E$, a direction in which such a drop occurs represents a positive direction of a variation rate and the rotation-speed variation-rate determining value $X_{AE}$ represents a positive value.

No probability takes place for the rapid decrease to occur in the engine rotation speed $N_E$ unless the engine drive mode is present with the engine 8 remaining under a driven state. Therefore, if the running-state determining means 70 determines that the running state is established during the engine drive mode, the rotation-stop determining means 72 effectuates its function but may be effectuated regardless of the existence of such a determination made by the running-state determining means 70.

Differential-portion output rotation-speed determining means 74 makes a query as to whether a rotation speed $N_{18}$ of the power transmitting member 18, representing the output shaft of the differential portion 11, exceeds a predetermined control-execution determining value $X1_{M2}$. More particularly, since the second electric motor M2 is connected to the power transmitting member 18, the differential-portion output rotation-speed determining means 74 determines as to whether a second-motor rotation speed $N_{M2}$ exceeds the control-execution determining value $X1_{M2}$. As used herein, the term "control-execution determining value $X1_{M2}$" refers to a predetermined determining value, set on a rotation speed (second-motor rotation speed $N_{M2}$) of the output shaft of the differential portion 11, based on which a determination is made to execute the engaging element control.

High-speed rotation determining means 76 makes a query as to whether the rotation speed $N_{18}$ (second-motor rotation speed $N_{M2}$) of the power transmitting member 18, representing the output shaft of the differential portion 11, exceeds a given control-method decision determining value $X2_{M2}$. As used herein, the term "control-method decision determining value $X2_{M2}$" refers to a predetermined determination value, set on the rotation speed (second-motor rotation speed $N_{M2}$) of the output shaft of the differential portion 11 to determine how the engaging element control is executed and also the determination value representing a value greater than the control-execution determining value $X1_{M2}$.

Engaging-element control executing means 78 executes the engaging element control when a determination is made that it is difficult or impossible to control the differential state of the differential portion 11 with use of only the first electric motor M1. In particular, under a condition where the rapid drop occurs in the engine rotation speed $N_E$, the greater the relative rotation speed between the engine rotation speed $N_E$ and the second-motor rotation speed $N_{M2}$ remarkably increases for a short period of time, the more difficult will be for the differential state of the differential portion 11 to be controlled. If the differential-portion output rotation-speed determining means 74 makes a positive determination, and the rotation-stop determining means 72 makes a positive determination, the engaging-element control-executing means 78 executes the engaging element control. That is, the engaging element control is executed when the rotation speed $N_{18}$ (second-motor rotation speed $N_{M2}$) of the power transmitting member 18 exceeds the control-execution determining value $X1_{M2}$, and when the rapid drop occurs in the engine rotation speed $N_E$ with the engine rotation acceleration $A_E$ exceeding the rotation-speed variation-rate determining value $X_{AE}$.

Here, the engaging element control is a control for permitting the engaging element remained engaged in the automatic shifting portion 20 to be placed in the disengaged state or the slip state (slipping state) as set forth above. Such a control is performed in different modes depending on a determination result of the high-speed rotation determining means 76. That is, if the high-speed rotation determining means 76 makes a positive determination, the engaging-element control-executing means 78 executes the engaging element control upon conducting the line-pressure reduction control. This reduces the line pressure representing an original pressure of working oil supplied to the respective engaging elements C1, C2, B1, B2 and B3 of the automatic shifting portion 20. The high-speed rotation determining means 76 makes a positive determination when the rotation speed $N_{18}$ (second-motor rotation speed $N_{M2}$) of the power transmitting member 18 exceeds the control-method decision determining value $X2_{M2}$. On the contrary, if the high-speed rotation determining means 76 makes a negative determination, the engaging-element control-executing means 78 executes the engaging element control so as to control the engagement-control electromagnetic valve 84 provided for actuating the engaging element (clutch or brake) of the automatic shifting portion 20 under engagement. That is, the engaging element control is executed upon conducting an engaged-element disengaging control for disengaging the engaging element remaining engaged.

More particularly, the engagement-control electromagnetic valve 84, serving as a hydraulic control valve for controlling the hydraulic pressure to be delivered to the respective engaging elements, executes the engaged-element disengaging control (clutch-disengaging control) by decreasing the hydraulic pressure delivered to the engaging element remained engaged in the automatic shifting portion 20. Under a circumstance where the automatic shifting portion 20 is placed in, for instance, the 3rd-speed gear position, if the engaged-element disengaging control is executed, then the hydraulic pressure, delivered to the first clutch C1 representing one engaging element among multiple engaging elements remained engaged, is reduced to allow the first clutch C1 in the disengaged or slip state.

The reduction in the hydraulic pressure delivered to the first clutch C1 is accomplished by the engagement-control electromagnetic valve 84 for the first clutch C1 remained engaged for coupling the power transmitting member 18 and the second electric motor M2 to the power transmitting path extending to the drive wheels 38. Under a situation where the automatic shifting portion 20 includes multiple engaging elements remaining under engaged states, it is not always true that the engaged-element disengaging control is performed to cause all of the engaging elements to be placed in the disengaged or slip states.

More particularly, the line pressure reduction control is achieved in one of or plural combinations of various control modes as described below. First, a line-pressure control electromagnetic valve 86 is actuated to function as a line pressure regulator valve enabling the line pressure to be regulated so as to reduce the line pressure. Second, an electrically operated hydraulic pump 88, operative to function as a line pressure generating device for generating the line pressure, is stopped or controlled in a direction to be rendered inoperative. Third, the manual valve 90, operative to function as the hydraulic pressure switching valve, is rendered inoperative to actuate in conjunction with the shift lever 49 and the manual valve 90 interrupts the supply of the line pressure or controls the line pressure in a direction to block the same. In other word, the manual valve 90 is controlled so as to assume a neutral "N" state such that none of the forward drive hydraulic pressure and the reverse drive hydraulic pressure is output.

Under a situation where the automatic shifting portion 20 is placed in, for instance, the 3rd-speed gear position, if the line-pressure reduction control is performed, then the line pressure is caused to decrease with an accompanying drop in hydraulic pressure delivered to the first clutch C1 and the first brake B1 representing a whole of the engaging elements remaining engaged in the automatic shifting portion 20 in engagements. This allows the first clutch C1 and the first brake B1 to be placed in the disengaged or slip states. Also, it is intended that the line-pressure reduction control lowers the hydraulic pressure supplied to the whole of the engaging elements remaining engaged in the automatic shifting portion 20 and no line pressure per se is lowered. However, the line-pressure reduction control may be executed upon causing the engagement-control electromagnet valves 84 to lower the hydraulic pressure delivered to the whole of the engaging elements remaining engaged in the automatic shifting portion 20.

Figure 9:
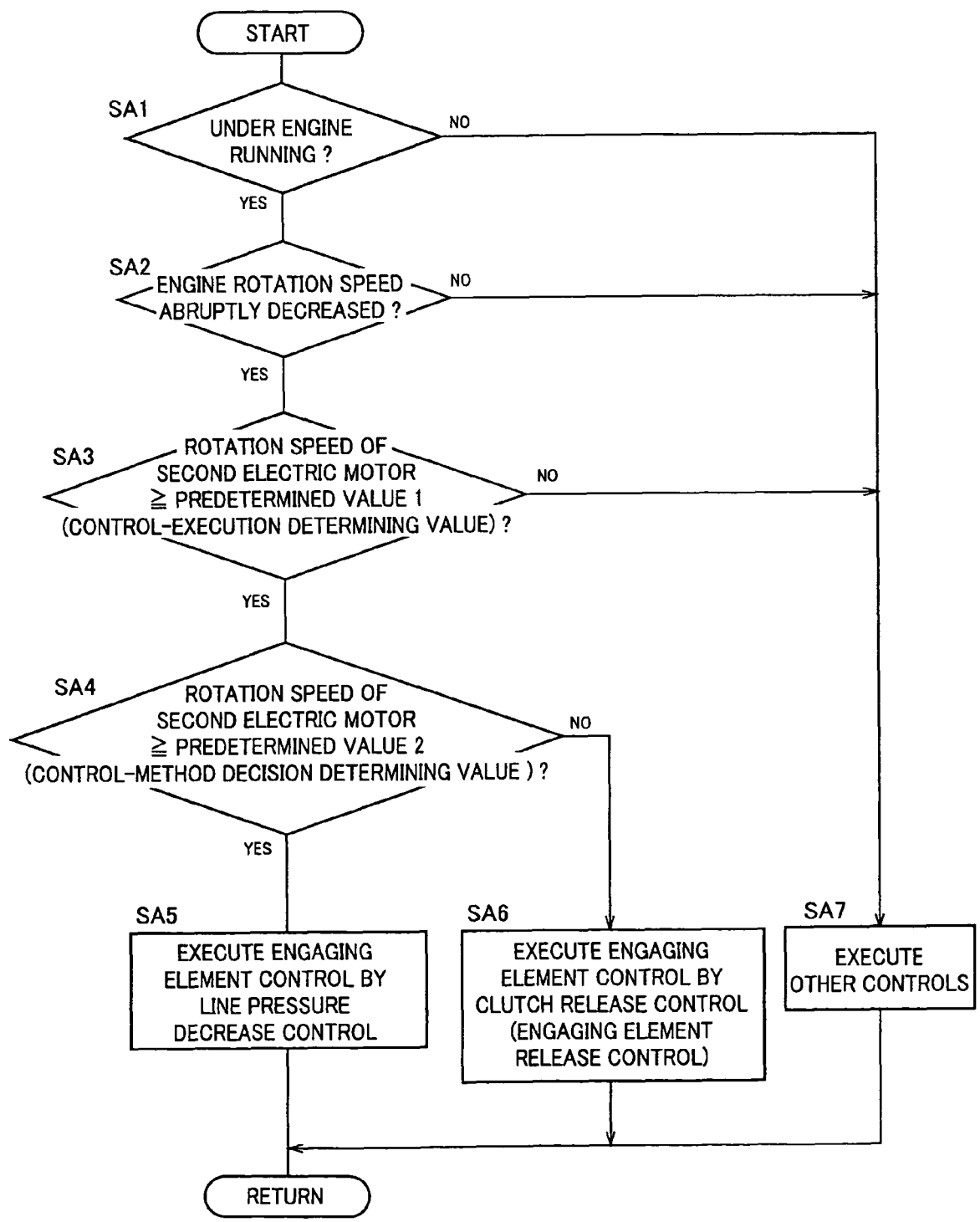
FIG. 9 is a flowchart illustrating a basic sequence of major control operations, i.e., control operations to be executed with the electronic control device shown in FIG. 4 for preventing the first electric motor from transiently reaching the high-speed rotation.

FIG. 9 is a flow chart illustrating a basic sequence of major control operations to be executed with the electronic control device 40, i.e., the control operations for preventing the first electric motor M1 from transiently reaching a high-speed rotation. This sequence is repeatedly executed on an extremely short period of cycle time in the order of, for instance, several milliseconds or several tens milliseconds.

First, at step (hereinafter the term "step" will be omitted) SA1 corresponding to the running-state determining means 70, a query is made as to whether a running state is under an engine drive mode. If the answer is YES, i.e., when the running state is under the engine drive mode, the control routine goes to SA2. If, on the other hand, the answer is NO, then the control routine proceeds to SA7.

At SA2 corresponding to the rotation-stop determining means 72, a query is made as to whether a rapid decrease occurs in the engine rotation speed $N_E$ with the engine rotation acceleration $A_E$ exceeding the rotation-speed variation-rate determining value $X_{AE}$. If the answer is YES, i.e., when the rapid drop occurs in the engine rotation speed $N_E$ with the engine rotation acceleration $A_E$ exceeding the rotation-speed variation-rate determining value $X_{AE}$, then the control routine goes to SA3. If, on the other hand, the answer is NO, then the control routine proceeds to SA7.

At SA3 corresponding to the differential-portion output rotation-speed determining means 74, a query is made as to whether the second-motor rotation speed $N_{M2}$ exceeds the control-execution determining value $X1_{M2}$. If the answer is YES, i.e., when the second-motor rotation speed $N_{M2}$ exceeds the control-execution determining value $X1_{M2}$, then the control routine goes to SA4. If, on the other hand, the answer is NO, then the control routine proceeds to SA7.

At SA4 corresponding to the high-speed rotation determining means 76, a query is made as to whether the second-motor rotation speed $N_{M2}$ exceeds the control-method decision determining value $X2_{M2}$. If the answer is YES, i.e., when the second-motor rotation speed $N_{M2}$ exceeds the control-method decision determining value $X2_{M2}$, then the control routine goes to SA5. If, on the other hand, the answer is NO, then the control routine proceeds to SA6.

At SA5, the line-pressure reduction control is executed to lower the line pressure in the automatic shifting portion 20, thereby conducting the engaging element control. With the automatic shifting portion 20 placed in, for instance, the 3rd-speed gear position, if the line-pressure reduction control is executed, the line pressure is lowered. This lowers the hydraulic pressure delivered to the first clutch C1 and the first brake B1 representing the whole of the engaging elements remaining engaged in the automatic shifting portion, causing the first clutch C1 and the first brake B1 to be placed in the disengaged or slip states.

At SA6, the operation is executed to control the engagement-control electromagnetic valve 84 provided for operating the engaging elements (clutch or brake) remaining engaged in the automatic shifting portion 20. This allows the engaged-element disengaging i.e. disengaging control (clutch disengagement i.e. release control) to be executed for performing the engaging element control to disengage the engaging element remaining engaged. With the automatic shifting portion 20 placed in, for instance, the 3rd-speed gear position, if the engaged-element disengaging control is executed, the hydraulic pressure delivered to the first clutch C1 is lowered by the engagement-control electromagnetic valve 84 for the first clutch C1 remained engaged for connecting the power transmitting member 18 and the second electric motor M2 to the power transmitting path extending to the drive wheels 38. In such a way, the first clutch C1 to be placed in the disengaged or slip state. Also, SA5 and SA6 correspond to claimed engaging-element control-executing means 78. At SA7, other controls including a control for the motor drive mode are carried out.

Figure 10:
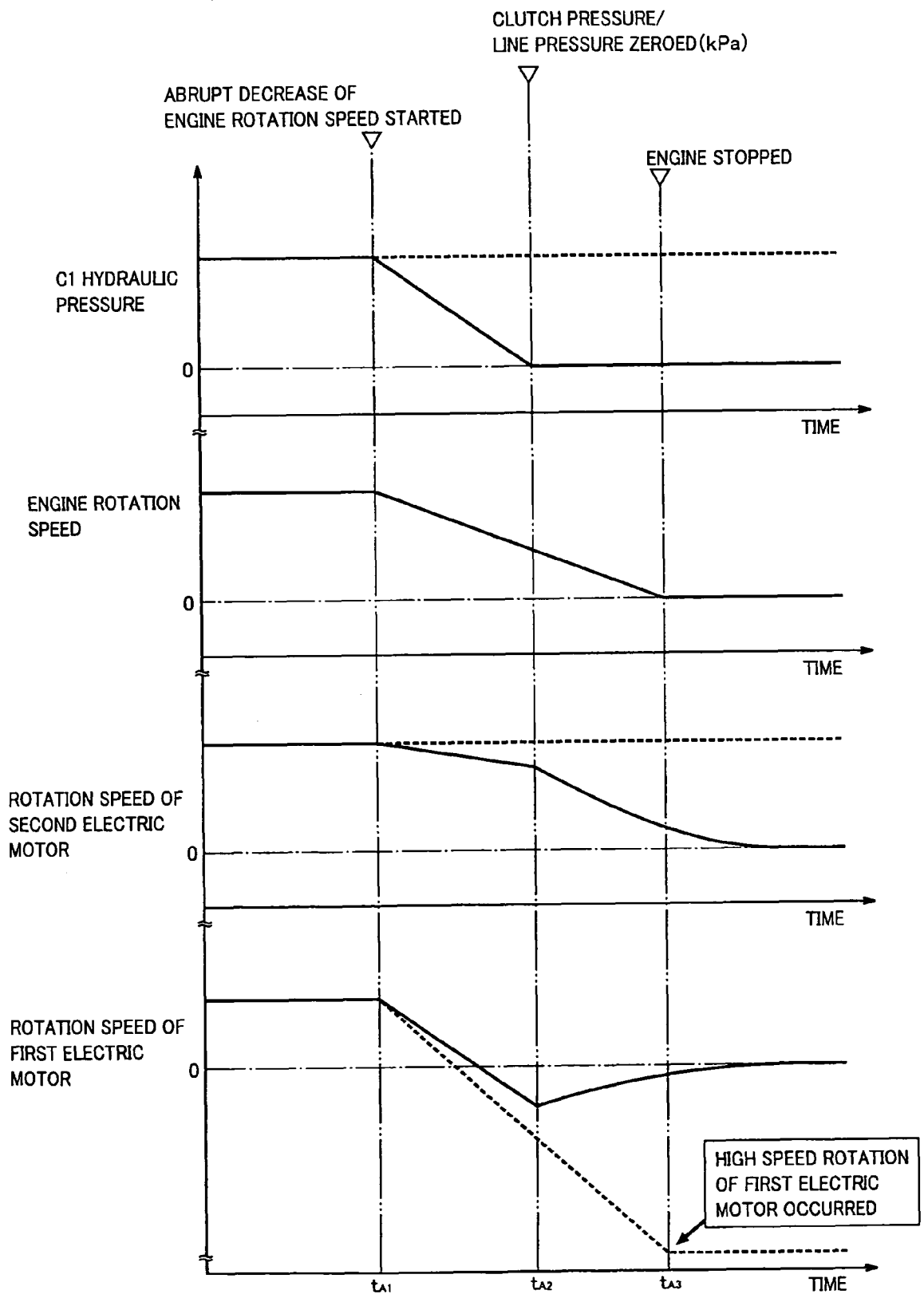
FIG. 10 is a timing chart illustrating the control operations shown in FIG. 9, which represents a case wherein a rapid drop i.e. decrease occurs in engine rotation speed during a phase in which an engine drive mode is conducted, under a condition where the switching clutch and the switching brake are disengaged with the automatic shifting portion remaining under the 3rd-speed gear position.

FIG. 10 is a timing chart, illustrating the control operations shown in the flow chart in FIG. 9, which represents an exemplary case wherein the rapid drop occurs in the engine rotation speed $N_E$ with the switching brake B0 and the switching clutch C0 disengaged and the automatic shifting portion 20 placed in the 3rd-speed gear position under the engine drive mode. FIG. 10 represents the timing chart beginning at the top indicated with C1-hydraulic pressure representing the hydraulic pressure delivered to the first clutch, the engine rotation speed $N_E$, the second-motor rotation speed $N_{M2}$ and the first-motor rotation speed $N_{M1}$. With the present embodiment, the rotation speed $N_{18}$ of the power transmitting member 18 (i.e., output shaft of the differential portion 11) and the second-motor rotation speed $N_{M2}$ are equal to each other. In this timing chart, further, solid lines represent variations in parameters achieved under the engaging element control being executed and broke lines represent variations in parameters with no engaging element control being executed.

In FIG. 10, time $t_{A1}$ indicates a phase at which the engine rotation acceleration $A_E$ exceeds the rotation-speed variation-rate determining value $X_{AE}$ and the engine rotation speed $N_E$ begins to rapidly drop. At this time point, the second-motor rotation speed $N_{M2}$ exceeds the control-execution determining value $X1_{M2}$. Then, the answer is YES at SA2 of the flow chart shown in FIG. 9 and, also, the answer is YES at SA3 of the flow chart shown FIG. 9. Thus, SA5 or SA6, shown in the flow chart of FIG. 9, are executed depending on the second-motor rotation speed $N_{M2}$ at relevant times. That is, the engaging element control is executed upon conducting the line-pressure reduction control or the engaged-element disengaging control.

As shown by the solid lines in FIG. 10, at time $t_{A1}$, the C1-hydraulic pressure begins to decrease and the first clutch C1 is brought into the slip state. Then, with such a decrease in C1-hydraulic pressure, the rapid drop in the engine rotation-speed $N_E$ results in a drag on the second-motor rotation speed $N_{M2}$, which consequently begins to decrease. Moreover, the first-motor rotation speed $N_{M1}$ is caused to begin varying in a negatively rotating direction.

In FIG. 10, time $t_{A2}$ indicates timing at which the C1-hydraulic pressure is zeroed with accompanying transition occurring on the first clutch C1 that is shifted from the slip state to the disengaged state. Then, a drive connection between the second electric motor M2 and the drive wheels 38 is completely interrupted to fall in a freewheeling state at time $t_{A2}$. As shown by the solid line in FIG. 10, therefore, the second-motor rotation speed $N_{M2}$ slowly decreases up to time $t_{A2}$ in conjunction with a decrease in the engine rotation speed $N_E$ but the second-motor rotation speed $N_{M2}$ rapidly decreases at time $t_{A2}$ and later. Accordingly, the first-motor rotation speed $N_{M1}$ has a tendency to increase in the negatively rotating direction during a time period up to time $t_{A2}$, after which the first-motor rotation speed $N_{M1}$ is caused to vary so as to converge to a zeroed level. That is, the first-motor rotation speed $N_{M1}$ marks a maximal level in the negatively rotating direction at time $t_{A2}$.

Time $t_{A3}$ in FIG. 10 indicates timing at which the engine rotation speed $N_E$ is zeroed. The first and second electric motors M1 and M2 are caused to stop due to their rotational resistances at times slightly delayed from time $t_{A3}$.

In FIG. 10, the broken lines represent timing charts indicating variations in parameters with no engaging element control being executed. Such an illustration is made for contrasting a case (in solid lines) under which the engaging element control is executed and another case (in broken lines) under which no engaging element control is executed. If no engaging element control is executed, no drop occurs in the C1-hydraulic pressure with the engagement hydraulic pressure remaining at a fixed level and the first clutch C1 remains intact under a completely engaged state. Therefore, the second-motor rotation speed $N_{M2}$, bound with the drive wheels 38 (vehicle speed V), remains fixed. Then, as shown by the broken line in FIG. 10, the first-motor rotation speed $N_{M1}$ increases to a high-speed rotating point in the negatively rotating direction during a time period up to time $t_{A3}$. At this time, the engine rotation speed $N_E$ is zeroed due to the differential action effectuated in the differential portion 11 and the first-motor rotation speed $N_{M1}$ reaches the maximum value in the negatively rotating direction.

Now, referring to FIG. 10, the maximum value of the first-motor rotation speed $N_{M1}$ in the negatively rotating direction with the engaging element control being executed is contrasted with the maximum value of the first-motor rotation speed $N_{M1}$ in the negatively rotating direction with no engaging element control being executed. That is, an absolute value of the first-motor rotation speed $N_{M1}$ at time $t_{A2}$, plotted on the timing chart in the solid line, is contrasted with an absolute value of the first-motor rotation speed $N_{M1}$ at time $t_{A3}$, plotted on the timing chart in the broken line. Then, it can be confirmed that the execution of the engaging element control provides a further increased effect of precluding the first-motor rotation speed $N_{M1}$ from reaching the high-speed rotation.

The electronic control device 40 of the present embodiment has various advantageous effects (A1) to (A11) as listed below.

(A1) During the engine drive mode, the rotation-stop determining means 72 makes a query as to whether the first rotary element RE1 is stopped or the related rotation speed decreases in a stop direction. If the answer is YES and the differential-portion output rotation-speed determining means 74 makes a positive determination, the engaging-element control-executing means 78 executes the engaging element control. Then, the third rotary element RE3 of the differential portion 11, connected to the drive wheels 38 via the operative engaging element of the automatic shifting portion 20, approaches a status available to freewheel. Therefore, due to the stop of the first rotary element E1 or the decreasing rotation speed thereof in the stop direction and the differential action of the differential portion 11, it becomes possible to prevent the second rotary element (second rotary element) RE2 and the first electric motor M1, connected thereto, from increasing to the high-speed rotation. This results in suppressing a durability decrease of the power distributing mechanism 16, the first electric motor M1 and the inverter 58 or the like.

(A2) If the rotation-stop determining means 72 makes a positive determination, the engaging element control is effectuated when the rotation speed (second-motor rotation speed $N_{M2}$) of the output shaft of the differential portion 11 exceeds the control-execution determining value $X1_{M2}$. The rapid drop in engine rotation speed $N_E$ and the differential action of the differential portion 11 allow the engaging element control to be effectuated with high probabilities in which the second rotary element RE2 and the first electric motor M1, connected thereto, are caused to rotate at the high speed. This achieves a reduction in control load-with a resultant capability of preventing the occurrence of the durability decrease of the power distributing mechanism 16, the first electric motor M1 and the inverter 58 or the like.

(A3) Under a situation where the differential-portion output rotation-speed determining means 74 makes a positive determination, if the rotation-stop determining means 72 makes a positive determination, i.e., when a rapid drop occurs in engine rotation speed $N_E$ to cause the engine rotation acceleration $A_E$ to exceed the given rotation speed variation-rate determining value $X_{AE}$, the engaging-element control-executing means 78 executes the engaging element control. Thus, the engaging element control is effectuated especially when the second rotary element RE2 and the first electric motor M1, connected thereto, reaches the high-speed rotation with high probabilities due to the rapid drop in engine rotation speed $N_E$ and the differential action of the differential portion 11. This achieves a reduction in control load with a resultant capability of preventing the occurrence of the durability decrease of the power distributing mechanism 16, the first electric motor M1 and the inverter 58 or the like.

(A4) The engaging-element control-executing means 78 executes the engine element control when a determination is made that it is difficult or impossible to control the differential state of the differential portion 11 with the use of only the first electric motor M1. Therefore, if the second rotary element RE2 and the first electric motor M1, connected thereto, are prevented from reaching the high-speed rotation even when no engaging element control is effectuated, then the engaging element control is not effectuated. This achieves a reduction in control load with a resultant capability of preventing the occurrence of a durability decrease of the power distributing mechanism 16, the first electric motor M1 and the inverter 58 or the like.

(A5) The differential portion 11 is the electrically controlled differential portion in which controlling the operating state of the first electric motor M1 connected to the second rotary element RE2 allows the differential state of the differential portion 11 to be controlled. The shifting mechanism 10 includes the second electric motor M2, to which the power transmitting path is connected, and the first rotary element RE1 is connected to the engine 8. Thus, by controlling the differential state of the differential portion 11, the engine 8 can be driven with no restraint from the vehicle speed so as to reach a rotation speed that can realize optimum fuel consumption. In addition, the use of the second electric motor M2 can assist the output of the engine 8, while performing a motor drive mode for the vehicle to run with only the second electric motor M2 acting as a drive-force source.

(A6) The engaging element of the automatic shifting portion 20 is actuated in response to the hydraulic pressure and the engaging element control is effectuated under the line-pressure reduction control or the engaged-element disengaging control. With such controls being performed, the engaging element control can be easily executed through the hydraulic pressure control. Hereunder, an effect when the engaging element control is executed will be described below with reference to the FIG. 11 and FIG. 12.

Figure 11:
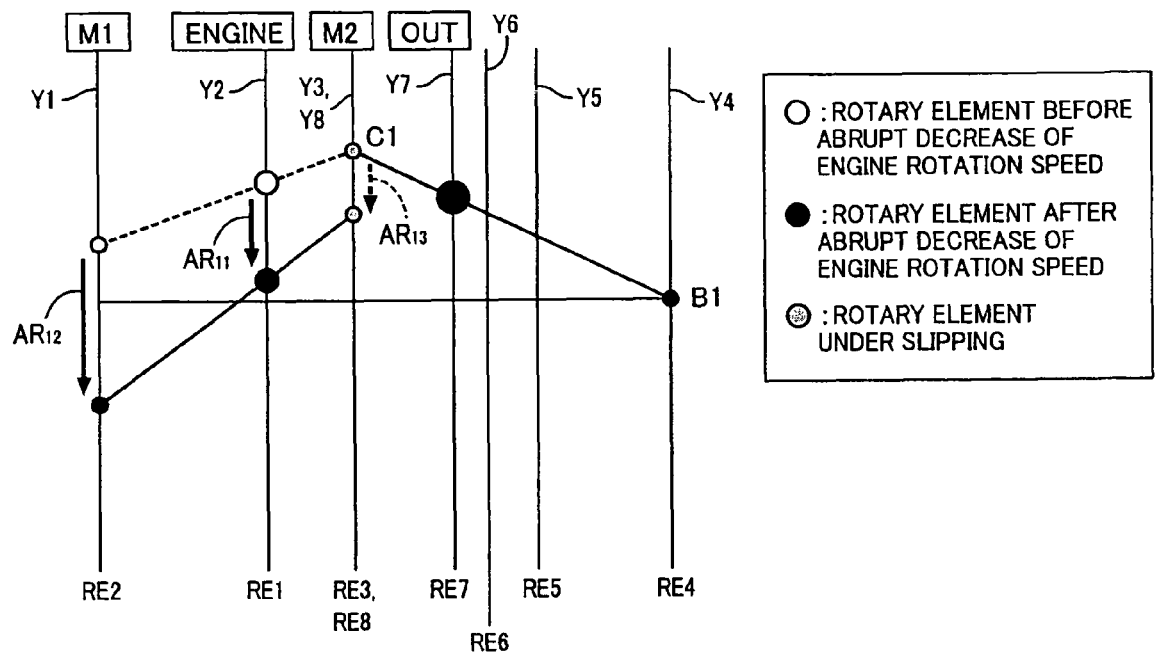
FIG. 11 is a collinear chart, illustrating how an engaging element control is effective to prevent the first electric motor from reaching the high-speed rotation in a negatively rotating direction, which is plotted with reference to an exemplary case wherein in the power transmitting apparatus for the hybrid vehicle, the switching clutch and the switching brake are disengaged in a differential portion and in the automatic shifting portion remaining under the 3rd-speed gear position with the first brake and the first clutch remaining engaged. This figure is a view, illustrating an effect under which the engaging element control is conducted upon executing an engaged-element disengaging control, which includes vertical lines Y1 to Y8 common to those of FIG. 3.
Figure 12:
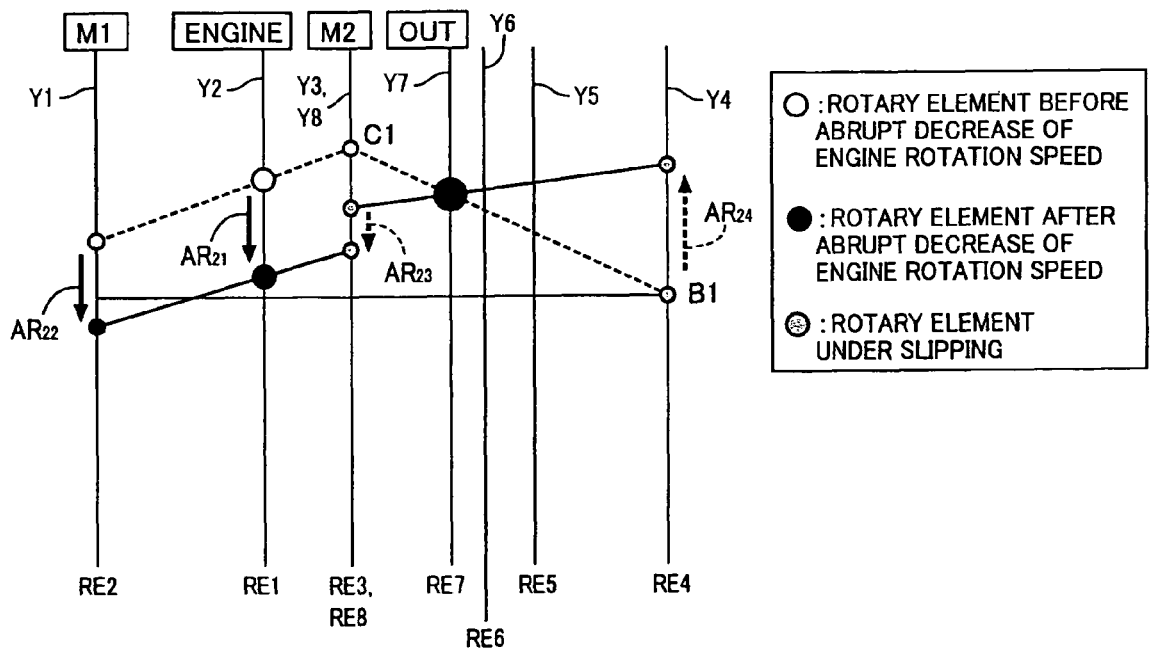
FIG. 12 is a collinear chart, illustrating how an engaging element control is effective to prevent the first electric motor from reaching the high-speed rotation in the negatively rotating direction, which is plotted with reference to an exemplary case wherein in the power transmitting apparatus for the hybrid vehicle, the switching clutch and the switching brake are disengaged in a differential portion and in the automatic shifting portion remaining under the 3rd-speed gear position with the first brake and the first clutch remaining engaged. This figure is a view, illustrating another effect under which the engaging element control is conducted upon executing a line pressure reduction control, which includes vertical lines Y1 to Y8 common to those of FIG. 3.

FIGS. 11 and 12 are collinear charts illustrating how the engaging element control prevents the first electric motor M1 from increasing to the high-speed rotation in the negatively rotating direction. Such a control is executed when the switching clutch C0 and the switching brake B0 are disengaged in the differential portion 11 and the automatic shifting portion 20 is placed in the 3rd-speed gear position with the first brake B1 and the first clutch C1 remaining engaged.

FIG. 11 is a view illustrating an effect when the engaging element control is executed under the engaged-element disengaging control, and FIG. 12 is a view illustrating an effect when the engaging element control is executed under the line-pressure reduction control. If a rapid drop occurs in engine rotation speed $N_E$ as indicated by an arrow $AR_{11}$ in FIG. 11, the engaging element control is executed to control the first clutch C1 in a disengaging direction with the first brake B1 remained engaged intact, thereby causing the first clutch C1 to be brought into the slip state. Then, a drag occurs on the second-motor rotation speed $N_{M2}$ as indicated by an arrow $AR_{13}$ due to the rapid drop in engine rotation speed $N_E$. Therefore, although the first-motor rotation speed $N_{M1}$ transiently has an absolute value that increases in a negatively rotating direction, the first-motor rotation speed $N_{M1}$ is prevented from increasing to the high-speed rotation in the negatively rotating direction in FIG. 11 in contrast to a case in which no engaging element control is executed in FIG. 8.

If the rapid drop occurs in engine rotation speed $N_E$ as indicated by an arrow $AR_{21}$ in FIG. 12, the line-pressure reduction control is performed so as to control both the first brake B1 and the first clutch C1 in a disengaging direction, causing the first brake B1 and the first clutch C1 to be brought into slip states. With the first brake B1 placed in the slip state, a drag occurs due to the rapid drop in engine rotation speed $N_E$ to cause the rotation speed of the fourth rotary element RE4 to increase as indicated by an arrow $AR_{24}$, thereby simultaneously causing a drop in rotation speed of the eighth rotary element RE8. With the first clutch C1 placed in the slip state, the second-motor rotation speed $N_{M2}$ further decreases to a level lower than the rotation speed of the eighth rotary element RE8 as indicated by an arrow $AR_{23}$. As a result, the first-motor rotation speed $N_{M1}$ is directed in the negatively rotating direction as indicated by an arrow $AR_{22}$. However, the engaging element control effectuated with the line-pressure reduction control, as shown in FIG. 12, provides a further increased effect of preventing the firs motor M1 from increasing to the high-speed rotation than that achieved with the engaging element control effectuated with the engaged-element disengaging control as show in FIG. 11.

(A7) The line-pressure reduction control is performed with, for instance, the line-pressure control electromagnetic valve 86 for reduction in the line pressure. In such a case, therefore, slightly controlling a hydraulic pressure unit, i.e., controlling the line-pressure control electromagnetic valve 86 allows a whole of the engaging elements, to which the line pressure is supplied, to actuate in disengaging directions.

(A8) The line-pressure reduction control is to allow, for instance, the electrically operated hydraulic pump 88 to be stopped or controlled in a stop direction. Therefore, by merely stopping the operation of the electrically operated hydraulic pump 88 or controlling the same in the stop direction, the line pressure is basically caused to decrease for thereby actuating the whole of the engaging elements, to which the line pressure is supplied, in the disengaging directions.

(A9) The line-pressure reduction control is to interrupt the interlocking operation of, for instance, the manual valve 90 with the shift lever 49, to allow the manual valve 90 to block the supply of the line pressure, or to control the same in a direction to block the supply of the line pressure. Therefore, by merely controlling the manual valve 90, the whole of the engaging elements, to which the line pressure is supplied, are operated in the disengaging directions.

(A10) The engaged-element disengaging control is effectuated when the engagement-control electromagnetic valve 84 lowers the hydraulic pressure being delivered to the engaging element remained engaged in the automatic shifting portion 20. Accordingly, the line pressure is not lowered when the engaging element control is executed but the line pressure is already recovered when the engaging element control is completed, making it easy to perform the control when recovered from the engaging element control.

(A11) The shifting mechanism 10 includes the automatic shifting portion 20 provided in the power transmitting path, and the engaging element used in such an engaging element control, is the component element of the automatic shifting portion 20. This allows the output of the engine 8 to be shifted in gear position for delivery to the drive wheels 38. Controlling the automatic shifting portion 20 results in a capability of preventing the first electric motor M1 from increasing to the high-speed rotation.

While the embodiment of the present invention has been described above with reference to the drawings, it is construed that the embodiment described be considered only as illustrative of the present invention and that the present invention may be implemented in various modifications and improvements based on knowledge of those skilled in the art.

In the flow chart shown in FIG. 9, for instance, under a circumstance where the positive determination is made at SA2 and, further, the positive determination is made at SA3, the engaging element control is executed at SA5 or SA6. However, the engaging element control may be executed in the absence of the determination made at SA3 but in the presence of the positive determination made at SA2.

If the answer is YES at SA3, no determination needs to be made at SA4 and either one of or both of the line-pressure reduction control at SA5 and the engaged-element disengaging control at SA6 may be conducted to effectuate the engaging element control.

Further, under a situation where the differential portion 11 is placed in the non-differential state with the switching brake B0 or the switching clutch C0 remaining engaged, no risk occurs for the first-motor rotation speed $N_{M1}$ to reach the high-speed rotation even if a rapid drop occurs in the engine rotation speed $N_E$. Therefore, with the differential portion 11 placed in the non-differential state, no engaging element control is performed with the engaging-element control-executing means 78.

Working oil of the automatic shifting portion 20, serving as lubricating fluid for the shifting mechanism 10, is also-used as the hydraulic pressure for the engaging elements B1, B2, B3, C1 and C2 of the automatic shifting portion 20. Therefore, there is a tendency in which the lower the temperature $TEMP_{ATF}$ of working oil (hereinafter referred to as "working oil temperature $TEMP_{ATF}$") in the automatic shifting portion 20, the lower will be the responses of the control signals being applied to the engaging elements B1, B2, B3, C1 and C2 adapted to be actuated with the hydraulic pressure. Moreover, each of the engaging elements B1, B2, B3, C1 and C2 is of a wet multiple-disc type. Therefore, if the working oil temperature is extremely lowered, working fluid (working oil), present between respective friction plates among the multiple plates, increases in viscosity with accompanying difficulty caused in controlling the engaging elements at appropriate slip rates.

With the above view in mind, the control-execution determining value $X1_{M2}$ may be altered in accordance with the working oil temperature $TEMP_{ATF}$. For instance, SA3', shown in FIG. 13, may be added between SA2 and SA3 of the flow chart shown in FIG. 9 to make an alteration such that the lower the working oil temperature $TEMP_{ATF}$, the less will be the control-execution determining value $X1_{M2}$. With such alteration, a condition for the engaging element control to be executed is altered depending on a degree of difficulty of controlling the engaging elements B1, B2, B3, C1 and C2. This results in suppressing a durability decrease of the power distributing mechanism 16, the first electric motor M1 and the inverter 58 or the like.

In the illustrated embodiment, while the first electric motor M1 and the second electric motor M2 are disposed on the differential portion 11, it may suffice for the first electric motor M1 and the second electric motor M2 to be disposed to the shifting mechanism 10 independent from the differential portion 11.

By controlling a drive state of the first electric motor M1, the differential portion 11 (power distributing mechanism 16) functions as an electrically controlled continuously variable transmission in which the speed ratio γ0 is continuously varied from the minimal value $γ0_{min}$ to the maximal value $γ0_{max}$. However, for instance, the speed ratio γ0 of the differential portion 11 is not continuously varied but pretended to vary step-by-step with the use of a differential action.

While the shifting mechanism 10 has been described above with reference to the structure in which the engine 8 and the differential portion 11 are directly connected to each other, it may suffice for the engine 8 to be connected to the differential portion 11 via an engaging element such as a clutch.

While in the shifting mechanism 10, the first electric motor M1 and the second rotary element RE2 are connected to each other in a direct connection, and the second electric motor M2 and the third rotary element RE3 are connected to each other in a direct connection, it may suffice for the first electric motor M1 to be connected to the second rotary element RE2 via an engaging element such as a clutch, and the second electric motor M2 to be connected to the third rotary element RE3 via an engaging element such as a clutch.

Although the automatic shifting portion 20 is connected to the power transmitting path extending from the engine 8 to the drive wheels 38 at a position next to the differential portion 11, the differential portion 11 may be connected in sequence to the output of the automatic shifting portion 20. The automatic shifting portion 20 may be provided to serve as a part of the power transmitting path extending from the engine 8 to the drive wheels 38.

While the differential portion 11 and the automatic shifting portion 20 are connected to each other in series in the structure shown FIG. 1, the present invention can be applied to a structure even if the differential portion 11 and the automatic shifting portion 20 are mechanically independent from each other provided that a whole of the shifting mechanism 10 has a function to achieve an electrically controlled differential action enabling a differential state to be electrically varied and a function to perform a shifting on a principle different from the function of the electrically controlled differential action.

While the power distributing mechanism 16 has been described above as of the single planetary type, the power distributing mechanism 16 may be of a doubled-planetary type.

In the illustrated embodiment, the engine 8 is connected to the first rotary element RE1 of the differential-portion planetary gear unit 24 for drive-force transmitting capability and the first electric motor M1 is connected to the second rotary element RE2 for drive-force transmitting capability while the power transmitting path for the drive wheels 38 is connected to the third rotary element RE3. However, the present invention may be applied to such a structure including, for instance, two planetary gear units wherein partial rotary elements, forming such planetary gear units, are connected to each other. With such a structure, an engine, an electric motor and drive wheels are connected to the rotary elements of the planetary gear units for drive-force transmitting capability such that a clutch or a brake, connected to the rotary elements of the planetary gear units, can be controlled to switch a shifting mode between a step-variable shifting mode and a continuously variable shifting mode.

While the automatic shifting portion 20 has been described above as having a function to serve as the step-variable automatic transmission, the automatic shifting portion 20 may include a continuously variable CVT.

The second electric motor M2 is directly connected to the power transmitting member 18. However, the connecting position of the second electric motor M2 is not necessarily limited to such connecting arrangement, but the second electric motor M2 may be directly connected to the power transmitting path extending from the engine 8 or the power transmitting member 18 to the drive wheels 38 or indirectly connected thereto via a transmission, a planetary gear unit, an engaging device or the like.

With the power distribution mechanisms 16 of the illustrated embodiments, the differential-portion carrier CA0 is connected to the engine 8; the differential-portion sun gear S0 is connected to the first electric motor M1; and the differential-portion ring gear R0 is connected to the power transmitting member 18. However, the present invention is not necessarily limited to such connecting arrangement, and the engine 8, first electric motor M1 and power transmitting member 18 have no objection to be connected to either one of the three elements CA0, S0 and R0 of the differential-portion planetary gear unit 24.

Although the illustrated embodiment has been described with reference to the engine 8 directly connected to the input shaft 14, these component parts may suffice to be operatively connected via, for instance, gears, belts or the like. No need may arise for the engine 8 and the input shaft 14 to be necessarily disposed on a common axis.

Further, while the illustrated embodiment has been described with reference to the first electric motor M1 and the second electric motor M2 wherein the first electric motor M1 is coaxially disposed with the drive apparatus input shaft 14 and connected to the differential-portion sun gear S0 upon which the second electric motor M2 is connected to the power transmitting member 18. However, no need arises for these component parts to be necessarily placed in such connecting arrangement. For example, the first electric motor M1 may be connected to the differential-portion sun gear S0 through gears, belts, speed reduction gears or the like, and the second-electric motor M2 may be connected to the power transmitting member 18.

While the illustrated embodiment has been described above with reference to the automatic transmission portion 20 that is connected to the differential portion 11 in series via the power transmitting member 18, a countershaft may be provided in parallel to the input shaft 14 to allow the automatic transmission portion 20 to be coaxially disposed on an axis of the countershaft. In this case, the differential portion 11 and the automatic transmission portion 20 may be connected to each other in power transmitting capability via a set of transmitting members structured of, for instance, a counter-gear pair acting as the power transmitting member 18, a sprocket and a chain.

The power distributing mechanism 16 of the illustrated embodiment has been described above as including one set of the differential-portion planetary gear unit 24, the power distributing mechanism 16 may include two or more sets of planetary gear units that are arranged to function as a transmission having three or more speed positions under a non-differential state (fixed shifting state).

The second electric motor M2 is connected to the power transmitting member 18 forming part of the power transmitting path extending from the engine 8 to the drive wheels 38. However, the second electric motor M2 is connected to its power transmitting path and also the second electric motor M2 may be connected to the power distributing mechanism 16 via the engaging element of the clutch or the like, so that a structure of the shifting mechanism 10 can be adopted in which the differential state of the power distributing mechanism 16 is controlled by the second electric motor M2 in place of the first electric motor M1.

What is claimed is:

1. A control device for a vehicular power transmitting apparatus, wherein:
    the power transmitting apparatus comprises a differential portion having a plurality of rotary elements, an engaging element provided in a part of a power transmitting path extending from an output shaft of the differential portion to drive wheels, and a prime mover being connected to a first rotary element of the differential portion of the power transmitting apparatus in a power transmissive state; and
    the control device is operative to execute an engaging element control for placing the engaging element in a disengaging state or a slip state, when the first rotary element of the differential portion is caused to stop or decrease in a rotation speed in a direction to stop the first rotary element during running of a vehicle, and when a rapid decrease occurs in a rotation speed of the prime mover such that a variation rate of the rotation speed of the prime mover per unit time exceeds a given rotation-speed variation-rate determining value.

2. The control device for the vehicular power transmitting apparatus according to claim 1, wherein the control device executes the engaging element control when a rotation speed of the output shaft of the differential portion exceeds a control-execution determining value.

3. The control device for the vehicular power transmitting apparatus according claim 1, wherein the differential portion of the power transmitting apparatus includes a second rotary element to which a first electric motor is connected in a power transmissive state to enable a differential state of the differential portion to be controlled; and
    the control device executes the engaging element control when difficulty or impossibility to control the differential state of the differential portion by only the first electric motor is determined.

4. The control device for the vehicular power transmitting apparatus according to claim 1, wherein the differential portion of the power transmitting apparatus includes an electrically controlled differential portion operative to control a differential state of the differential portion upon controlling an operating state of a first electric motor connected to a second rotary element of the differential portion in a power transmissive state; and
    the power transmitting apparatus further comprises a second electric motor connected to the power transmitting path.

5. The control device for the vehicular power transmitting apparatus according to claim 2, wherein the control-execution determining value is altered depending on a temperature of lubricating fluid in the power transmitting apparatus.

6. The control device for the vehicular power transmitting apparatus according to claim 1, wherein the power transmitting apparatus includes a shift portion provided in the power transmitting path and the engaging element includes component elements of the shifting portion.

7. The control device for the vehicular power transmitting apparatus according to claim 1, wherein the engaging element is actuated in response to hydraulic pressure, and the engaging element control is effectuated upon executing a line-pressure reduction control, operative to decrease the line pressure acting as an original pressure of working oil supplied to the engaging element, and/or the engaged-element disengaging control for operating the engaging element to a disengaging side.

8. The control device for the vehicular power transmitting apparatus according to claim 7, wherein the power transmitting apparatus includes a line pressure regulator valve operative to regulate the line pressure, and the line-pressure reduction control represents a control for causing the line pressure regulator valve to decrease the line pressure.

9. The control device for the vehicular power transmitting apparatus according to claim 7, wherein the power transmitting apparatus includes a line pressure generating device for generating the line pressure, and the line pressure control is to stop the line pressure generating device or to control the line pressure generating device in a direction for stopping.

10. The control device for the vehicular power transmitting apparatus according to claim 7, wherein the power transmitting apparatus includes a hydraulic pressure switching valve operative to be switched in conjunction with a shift lever in accordance with an electrical command signal based on the operation of the shift lever, and the line-pressure reduction control is to perform a control so as to prevent the hydraulic pressure switching valve from operating with the shift lever in an interlocking relationship and to interrupt the line pressure being delivered to the engaging element or to perform a control in a direction for interruption.

11. The control device for the vehicular power transmitting apparatus according to claim 7, wherein the power transmitting apparatus includes a hydraulic pressure control valve operative to reduce the line pressure for supply to the engaging element, and the engaged-element disengaging control is effectuated upon causing the hydraulic pressure control valve to decrease the hydraulic pressure being delivered to the engaging element.

* * * * *